(12) United States Patent
Kim et al.

(10) Patent No.: US 8,625,521 B2
(45) Date of Patent: *Jan. 7, 2014

(54) APPARATUS AND METHOD FOR MONITORING CONTROL CHANNEL IN MULTI-CARRIER SYSTEM

(75) Inventors: So Yeon Kim, Anyang-si (KR); Sung Ho Moon, Anyang-si (KR); Jae Hoon Chung, Anyang-si (KR); Yeong Hyeon Kwon, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 135 days.

This patent is subject to a terminal disclaimer.

(21) Appl. No.: 13/320,529

(22) PCT Filed: May 14, 2010

(86) PCT No.: PCT/KR2010/003068
§ 371 (c)(1),
(2), (4) Date: Nov. 14, 2011

(87) PCT Pub. No.: WO2010/131927
PCT Pub. Date: Nov. 18, 2010

(65) Prior Publication Data
US 2012/0063350 A1    Mar. 15, 2012

Related U.S. Application Data

(60) Provisional application No. 61/178,053, filed on May 14, 2009, provisional application No. 61/285,547, filed on Dec. 11, 2009, provisional application No. 61/285,550, filed on Dec. 11, 2009, provisional application No. 61/292,435, filed on Jan. 5, 2010, provisional application No. 61/298,214, filed on Jan. 26, 2010, provisional application No. 61/307,861, filed on Feb. 25, 2010, provisional application No. 61/309,821, filed on Mar. 2, 2010, provisional application No. 61/318,791, filed on Mar. 30, 2010, provisional application No. 61/323,877, filed on Apr. 14, 2010, provisional application No. 61/327,080, filed on Apr. 22, 2010, provisional application No. 61/328,607, filed on Apr. 27, 2010.

(30) Foreign Application Priority Data

May 14, 2010   (KR) .................. 10-2010-0045371

(51) Int. Cl.
*H04W 4/00* (2009.01)
*H04J 3/00* (2006.01)

(52) U.S. Cl.
USPC .......................................... 370/329; 370/337

(58) Field of Classification Search
USPC .......... 370/328, 329, 330, 334, 337, 347, 336
See application file for complete search history.

(56) References Cited

U.S. PATENT DOCUMENTS

2009/0028103 A1   1/2009   Wang et al.
2009/0116432 A1   5/2009   Ma et al.
(Continued)

FOREIGN PATENT DOCUMENTS

JP   2008-514047   5/2008
JP   2008-547291   12/2008

*Primary Examiner* — Andrew Lee
(74) *Attorney, Agent, or Firm* — Lee, Hong, Degerman, Kang & Waimey

(57) ABSTRACT

Provided are an apparatus and a method for monitoring a control channel in a multi-carrier system. A plurality of sub-search spaces within an extended search space corresponds to a plurality of scheduled component carriers, respectively. Each of the plurality of sub-search spaces includes a plurality of control channel elements (CCEs), and the CCEs of the plurality of sub-search spaces are interleaved with each another within the extended search space.

10 Claims, 30 Drawing Sheets

(56) References Cited

U.S. PATENT DOCUMENTS

| | | | |
|---|---|---|---|
| 2010/0296467 A1* | 11/2010 | Pelletier et al. | 370/329 |
| 2012/0155316 A1* | 6/2012 | Li et al. | 370/252 |
| 2012/0188961 A1* | 7/2012 | Suzuki et al. | 370/329 |
| 2012/0263052 A1* | 10/2012 | Dai et al. | 370/252 |
| 2012/0281576 A1* | 11/2012 | Yamada et al. | 370/252 |
| 2012/0320838 A1* | 12/2012 | Yang et al. | 370/329 |
| 2013/0022014 A1* | 1/2013 | Hong et al. | 370/329 |
| 2013/0088973 A1* | 4/2013 | Yang et al. | 370/241 |
| 2013/0107844 A1* | 5/2013 | Li et al. | 370/329 |

* cited by examiner

FIG. 20

|  | # of PDCCH candidates at aggregation level L | | | | | |
|---|---|---|---|---|---|---|
| #of Sub-Search Space | 0 | 1 | 2 | 3 | 4 | 5 |
| | 6 | 7 | 8 | 9 | 10 | 11 |
| | 12 | 13 | 14 | 15 | 16 | 17 |

FIG. 21

|  | # of PDCCH candidates at aggregation level L ||||||
|---|---|---|---|---|---|---|
| # of Sub-Search Space | 0 | 1 | 2 | 3 | 4 | 5 |
| | 9 | 10 | 11 | 12 | 13 | 14 |
| | 18 | 19 | 20 | 21 | 22 | 23 |

FIG. 24

CCE index before Block Interleaving

| CCE index | 0 | 1 | 2 | 3 | 4 | 5 | 6 | 7 | 8 | 9 | 10 | 11 | 12 | 13 | 14 | 15 | 16 | 17 |

CCE index after Block Interleaving

| CCE index | 0 | 6 | 12 | 1 | 7 | 13 | 2 | 8 | 14 | 3 | 9 | 15 | 4 | 10 | 16 | 5 | 11 | 17 |

FIG. 26

|  | # of PDCCH candidates at aggregation level 4 | |
|---|---|---|
| # of Sub-Search Space | 0 | 4 |
|  | 8 | 12 |
|  | 16 | 20 |

APPARATUS AND METHOD FOR MONITORING CONTROL CHANNEL IN MULTI-CARRIER SYSTEM

CROSS-REFERENCE TO RELATED APPLICATIONS

This application is a 371 U.S. national stage application the National Stage filing under 35 U.S.C. 371 of International Application No. PCT/KR2010/003068, filed on May 14, 2010, which claims the benefit of earlier filing date and right of priority to Korean Application Serial No. 10-2010-0045371, filed on May 14, 2010, and claims the benefit of U.S. Provisional Application Ser. Nos. 61/328,607, filed on Apr. 27, 2010, 61/327,080, filed on Apr. 22, 2010, 61/323,877, filed on Apr. 14, 2010, 61/318,791, filed on Mar. 30, 2010, 61/309,821, filed on Mar. 2, 2010, 61/307,861, filed on Feb. 25, 2010, 61/298,214, filed on Jan. 26, 2010, 61/292,435, filed on Jan. 5, 2010, 61/285,550, filed on Dec. 11, 2009, 61/285,547, filed on Dec. 11, 2009, and 61/178,053, filed on May 14, 2009, the contents of all of which are incorporated by reference herein in their entirety.

TECHNICAL FIELD

The present invention relates to wireless communication. More specifically, the present invention relates to an apparatus and method for monitoring a control channel in a wireless communication system.

BACKGROUND ART

Although bandwidth is set differently between uplink and downlink, only one carrier is generally considered in the conventional wireless communication system. The carrier is defined by a center frequency and a bandwidth. A multiple carrier system uses a plurality of component carriers (CCs) having narrow bandwidth than full bandwidth.

A multiple carrier system can support backward compatibility for legacy systems and also increase data rate significantly through multiple carriers.

Long term evolution (LTE) based on 3rd Generation Partnership Project (3GPP) Technical Specification (TS) Release 8 is a promising, next-generation mobile communication standard. A 3GPP LTE system is a single carrier system supporting only one bandwidth (i.e., one CC) among 1.4, 3, 5, 10, and 20 MHz. However, LTE-Advanced (LTE-A), which is an evolved version of the 3GPP LTE, employs multiple carriers.

In a single carrier system, control channels and data channels are designed based on a single carrier. However, it can be inefficient if a multiple carrier system employs the channel structure of a single carrier system as it is.

DISCLOSURE

Technical Problem

The present invention provides a method and an apparatus for monitoring a control channel in a multiple carrier system.

The present invention also provides a method and an apparatus of transmitting a control channel in a multiple carrier system.

Technical Solution

In an aspect, a method for monitoring a control channel in a multiple carrier system is provided. The method includes determining an extended search space including a plurality of sub-search space in a control region of a subframe, each of the plurality of sub-search spaces corresponding to each of a plurality of scheduled component carriers, monitoring a downlink control channel for a scheduled component carrier corresponding to each of the plurality of sub-search spaces, and receiving downlink control information for a scheduled component carrier on a downlink control channel which is successfully decoded, each of the plurality of sub-search spaces including a plurality of control channel elements (CCEs), wherein the CCEs of the plurality of sub-search spaces are interleaved with one another in the extended search space.

The CCEs of the plurality of sub-search spaces may be interleaved by the unit of CCE aggregation level.

The CCEs of the plurality of sub-search spaces may be interleaved in an interlaced form.

The CCEs of the plurality of sub-search spaces may be interleaved by the unit of at least one CCE.

The plurality of sub-search spaces may be divided into a plurality of sub-groups and CCEs of a sub-search space belonging to each subgroup may be interleaved with one another.

In another aspect, a user equipment for monitoring a control channel in a multiple carrier system is provided. The user equipment includes a radio frequency unit configured to transmit and receive radio signals, and a processor operatively connected to the radio frequency unit and configured to determine an extended search space including a plurality of sub-search space in a control region of a subframe, each of the plurality of sub-search spaces corresponding to each of a plurality of scheduled component carriers, monitor a downlink control channel for a scheduled component carrier corresponding to each of the plurality of sub-search spaces, and receive downlink control information for a scheduled component carrier on a downlink control channel which is successfully decoded, each of the plurality of sub-search spaces including a plurality of control channel elements (CCEs), wherein the CCEs of the plurality of sub-search spaces are interleaved with one another in the extended search space.

Advantageous Effects

Since control channels for multiple component carriers can be scheduled in a single subframe, a probability of control channel blocking can be reduced. Also, by reducing decoding complexity in an extended search space, a burden due to blind decoding and subsequently battery consumption of a user equipment can be reduced.

DESCRIPTION OF DRAWINGS

FIG. 20 illustrates an example of a block interleaver for interleaving of FIG. 16.

FIG. 21 illustrates an example of a block interleaver in an extended search space to which an offset is applied.

FIG. 24 illustrates another example of configuring an output of a block interleaver.

FIG. 26 illustrates an example of a block interleaver for interleaving of FIG. 17.

MODE FOR INVENTION

A user equipment (UE) can be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station generally a fixed station that communicates with the UE and may be referred to as another terminology, such as an evolved node-B (eNB), a base transceiver system (BTS), an access point, etc.

Each base station provides a communication service for a particular geographical region (generally referred to as a cell). A cell can be further divided into a plurality of regions (referred to as sectors).

Hereinafter, downlink (DL) implies communication from the BS to the UE while uplink (UL) from the UE to the BS. In DL, a transmitter may be a part of the BS and a receiver may be a part of the UE. On the other hand, in UL, the transmitter may be a part of the UE and the receiver may be a part of the BS.

Figure 1:
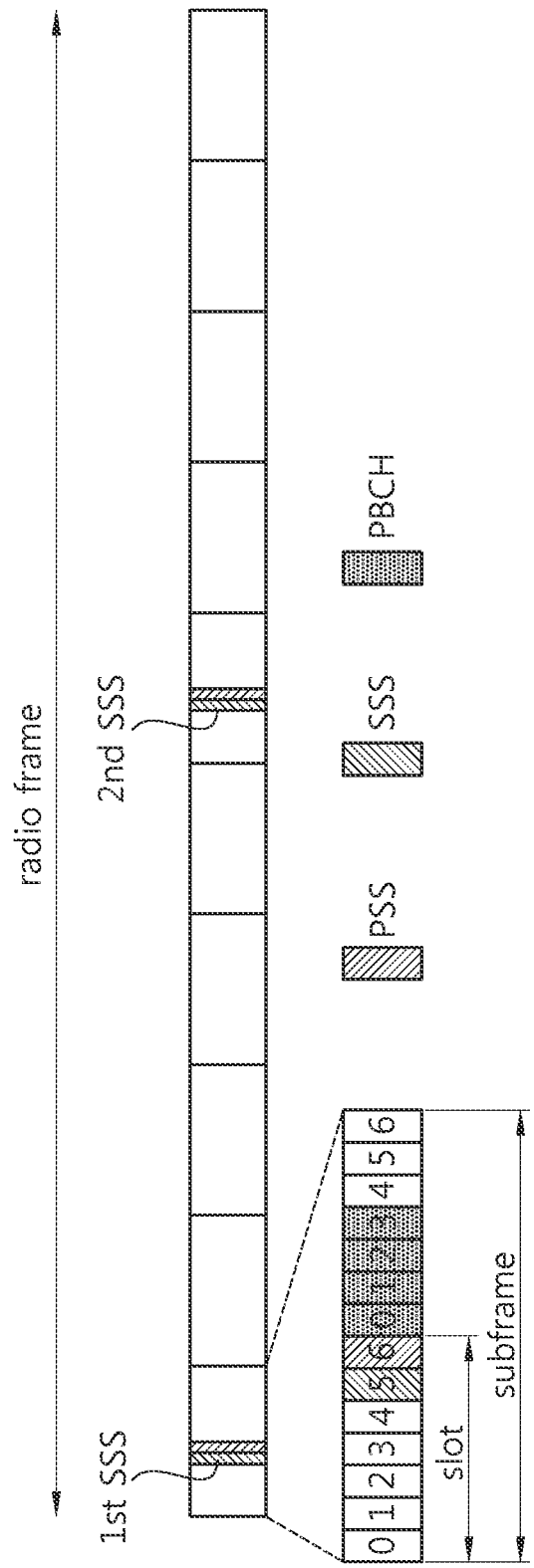
FIG. 1 illustrates the structure of a radio frame in a 3GPP LTE.

FIG. 1 illustrates the structure of a radio frame in a 3GPP LTE. The section 6 of 3GPP TS 36.211 V8.5.0 (December 2008) "Evolved Universal Terrestrial Radio Access (E-UTRA); Physical Channel and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in time domain. Since the 3GPP LTE uses orthogonal frequency division multiple access (OFDMA) in DL, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol duration, etc.

Although it is described that one slot includes 7 OFDM symbols for example, the number of OFDM symbols included in one slot may vary depending on a length of a cyclic prefix (CP). According to 3GPP TS 36.211 V8.5.0 (December 2008), in case of a normal CP, one subframe includes 7 OFDM symbols, and in case of an extended CP, one subframe includes 6 OFDM symbols.

A primary synchronization signal (PSS) is transmitted to the last OFDM symbol of a first (first slot of the first subframe which has an index 0) and an eleventh slot (first slot of the sixth subframe which has an index 5). The PSS is used to obtain OFDM symbol synchronization or slot synchronization, and is related to a physical identity (ID). The primary synchronization code (PSC) is a sequence used for the PSS, and the 3GPP LTE uses three PSCs. One of the three PSCs is transmitted to the PSS according to the cell ID. The same PSC is used for each of the last OFDM symbol of the first and the 11-the slot.

A secondary synchronization signal (SSS) comprises a first SSS and a second SSS. The first SSS and the second SSS are transmitted from an OFDM symbol contiguous with the OFDM symbol to which the PSS is transmitted. The SSS is used for obtaining frame synchronization. The SSS is used for obtaining a cell ID along with the PSS. The first SSS and the second SSS use secondary synchronization codes (SSCs) different from each other. Each of the first SSS and the second SSS includes 31 subcarriers. On SSC has a length of 31 and two SSCs are included in the first SSS and the second SSS.

A physical broadcast channel (PBCH) is transmitted from preceding four OFDM symbols of the second slot of the first subframe. The PBCH carries system information essential for communication between the UE and the BS, and the system information transmitted through the PBCH is referred to as master information block (MIB). On the other hand, the system information transmitted to a physical downlink shared channel (PDSCH) indicated by a physical downlink control channel (PDCCH) is referred to as system information block (SIB).

As specified in the 3GPP TS36.211 V8.5.0 (December 2008), physical channels of the LTE can be classified into a data channel and a control channel, where the data channel includes a physical downlink shared channel (PDSCH) and a physical uplink shared channel (PUSCH); and the control channel includes a physical downlink control channel, a physical control format indicator channel, a physical hybrid-ARQ indicator channel (PHICH), and a physical uplink control channel.

Figure 2:
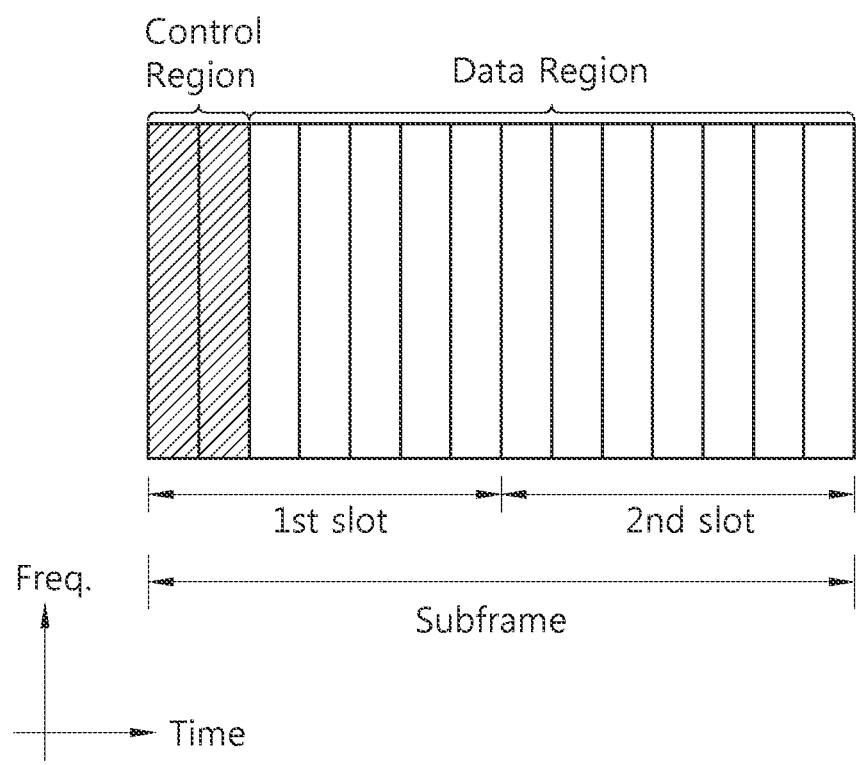
FIG. 2 is a diagram showing the structure of a downlink subframe in a 3GPP LTE.

FIG. 2 is a diagram showing the structure of a downlink subframe in a 3GPP LTE. A subframe includes a control region and a data region in time domain. The control region can include up to three preceding OFDM symbols of a first slot in the sub frame. The number of OFDM symbols included in the control region may vary. A PDCCH is allocated to the control region while a PDSCH is allocated to the data region.

A resource block (RB) is a resource allocation unit, and includes a plurality of subcarriers in one slot. For example, if one slot includes seven OFDM symbols in the time domain and an RB includes 12 subcarriers in the frequency domain, one RB can include 7*12 resource elements (REs).

A PCFICH transmitted from a first OFDM symbol of the subframe carries a control format indicator (CFI) regarding the number of OFDM symbols (i.e., the size of the control region) used for transmission of control channels in the subframe. The UE first receives the CFI over the PCFICH and then monitors the PDCCH.

A PHICH carries an positive-acknowledgement (ACK)/negative-acknowledgement (NACK) signal for uplink hybrid automatic repeat request (HARQ). The ACK/NACK signal for uplink data transmitted by the UE is transmitted on the PHICH.

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

Figure 3:
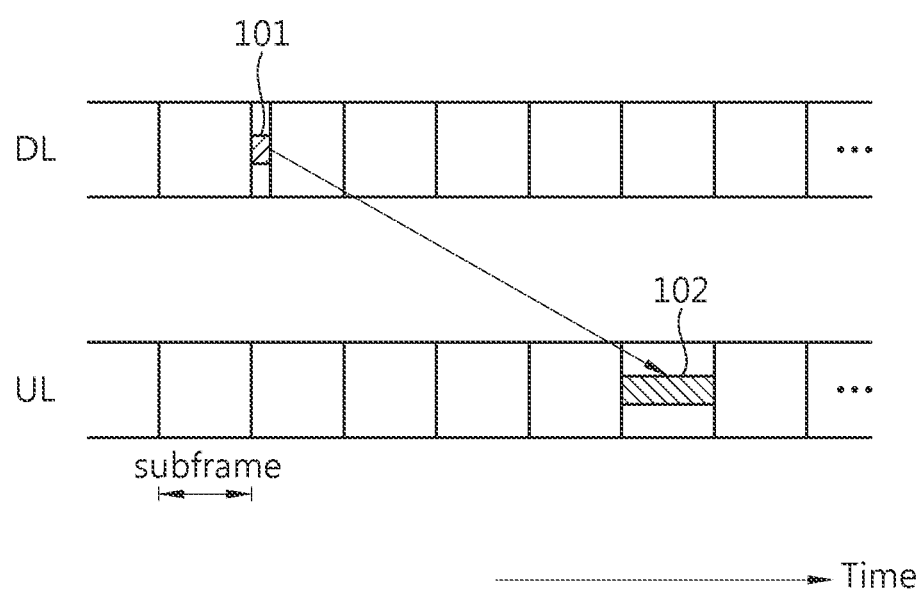
FIG. 3 is an exemplary diagram showing the transmission of uplink data.

FIG. 3 is an exemplary diagram showing the transmission of uplink data. A UE receives an uplink resource assignment on a PDCCH 101 by monitoring PDCCHs in a downlink subframe. The UE transmits an uplink data packet on a PUSCH 102 which can be constructed by using the uplink resource assignment.

Figure 4:
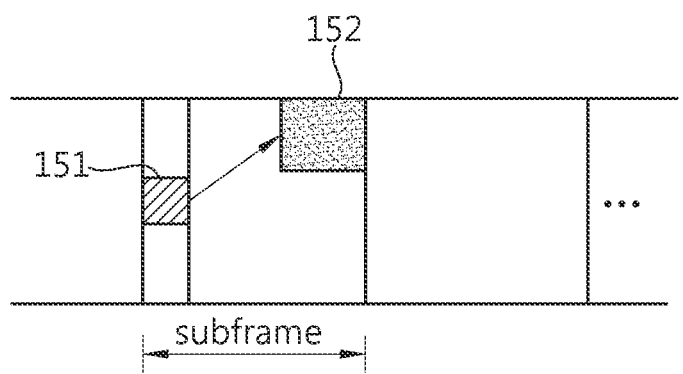
FIG. 4 is an exemplary diagram shown the reception of downlink data.

FIG. 4 is an exemplary diagram showing the reception of downlink data. A UE receives a downlink data packet on a PDSCH 152 indicated by a PDCCH 151. The UE receives a downlink resource assignment on the PDCCH 151 by monitoring PDCCHs in a downlink subframe. The UE receives the downlink data packet on the PDSCH 152 indicated by the downlink resource assignment.

Figure 5:
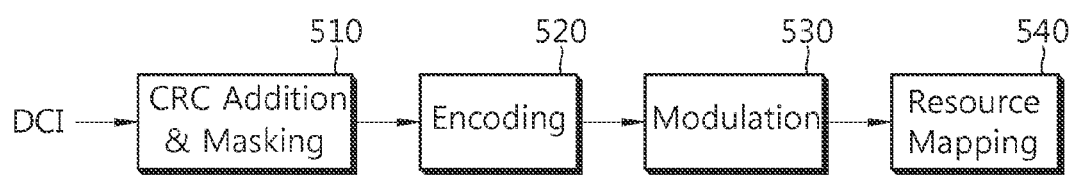
FIG. 5 is a block diagram showing the construction of a PDCCH.

FIG. 5 is a block diagram showing a structure of a PDCCH. A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (this is referred to as UE-specific control information), and when other RNTIs are used, the PDCCH carries common control information received by all or a plurality of UEs in a cell.

The CRC-attached DCI is encoded to generate coded data (block 520). Encoding includes channel encoding and rate matching.

The coded data is modulated to generate modulation symbols (block 530).

The modulation symbols are mapped to physical resource elements (REs) (block 540). The modulation symbols are respectively mapped to the REs.

Figure 6:
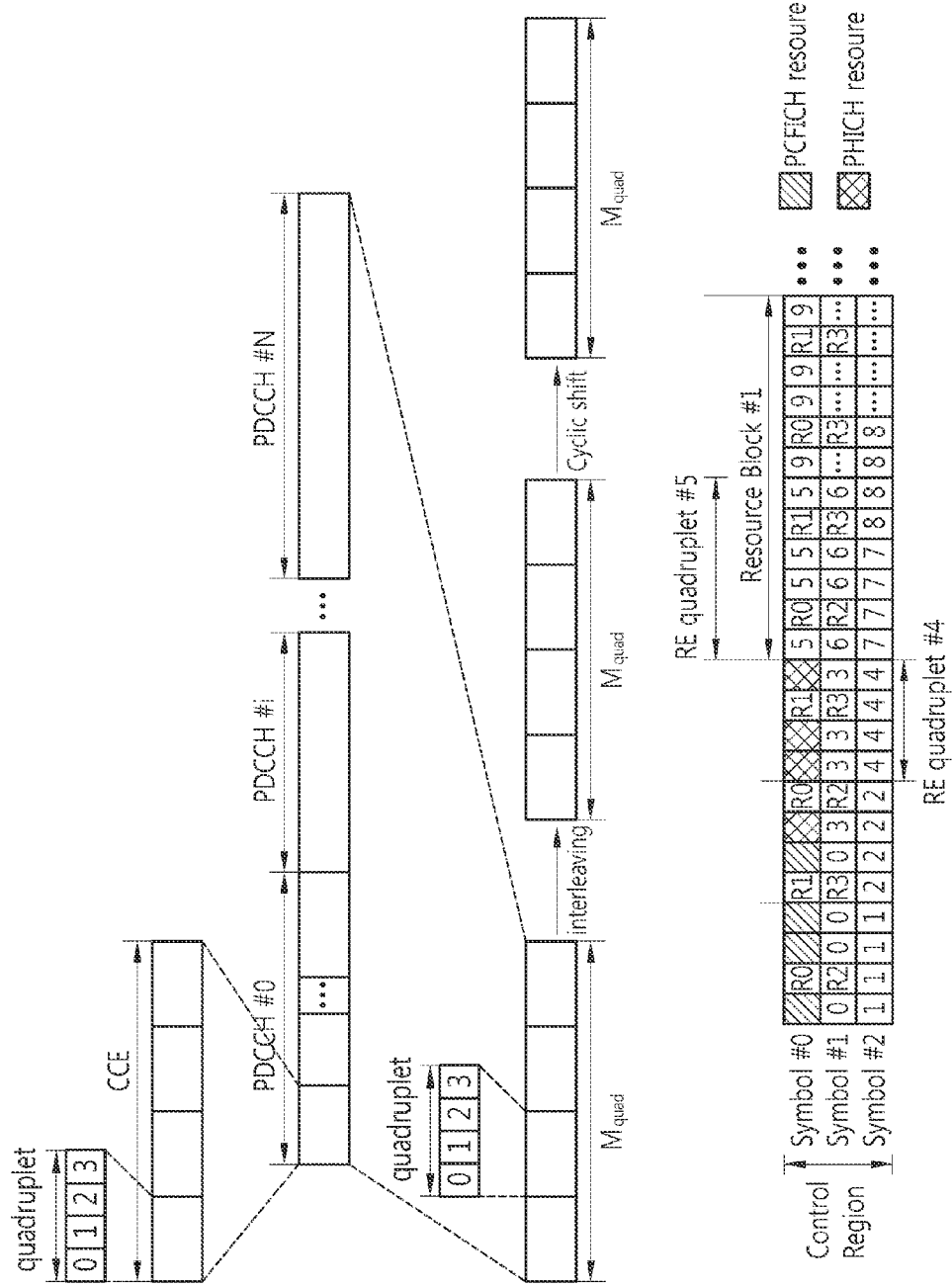
FIG. 6 is a diagram showing an example of resource mapping of a PDCCH.

FIG. 6 shows exemplary resource mapping of a PDCCH. This can refer to the section 6.8 of 3GPP TS 36.211 V8.5.0 (December 2008). R0 denotes a reference signal of a first antenna, R1 denotes a reference signal of a second antenna, R2 denotes a reference signal of a third antenna, and R3 denotes a reference signal of a fourth antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). An REG includes a plurality of resource elements. According to a relationship between the number of CCEs and the coding rate provided by the CCEs, a PDCCH format and a possible number of bits of the PDCCH are determined.

One REG (indicated by a quadruple in FIG. 6) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel including one or more CCEs performs interleaving in unit of REG unit, and is mapped to a physical resource after performing cyclic shift based on a cell identifier (ID).

Figure 7:
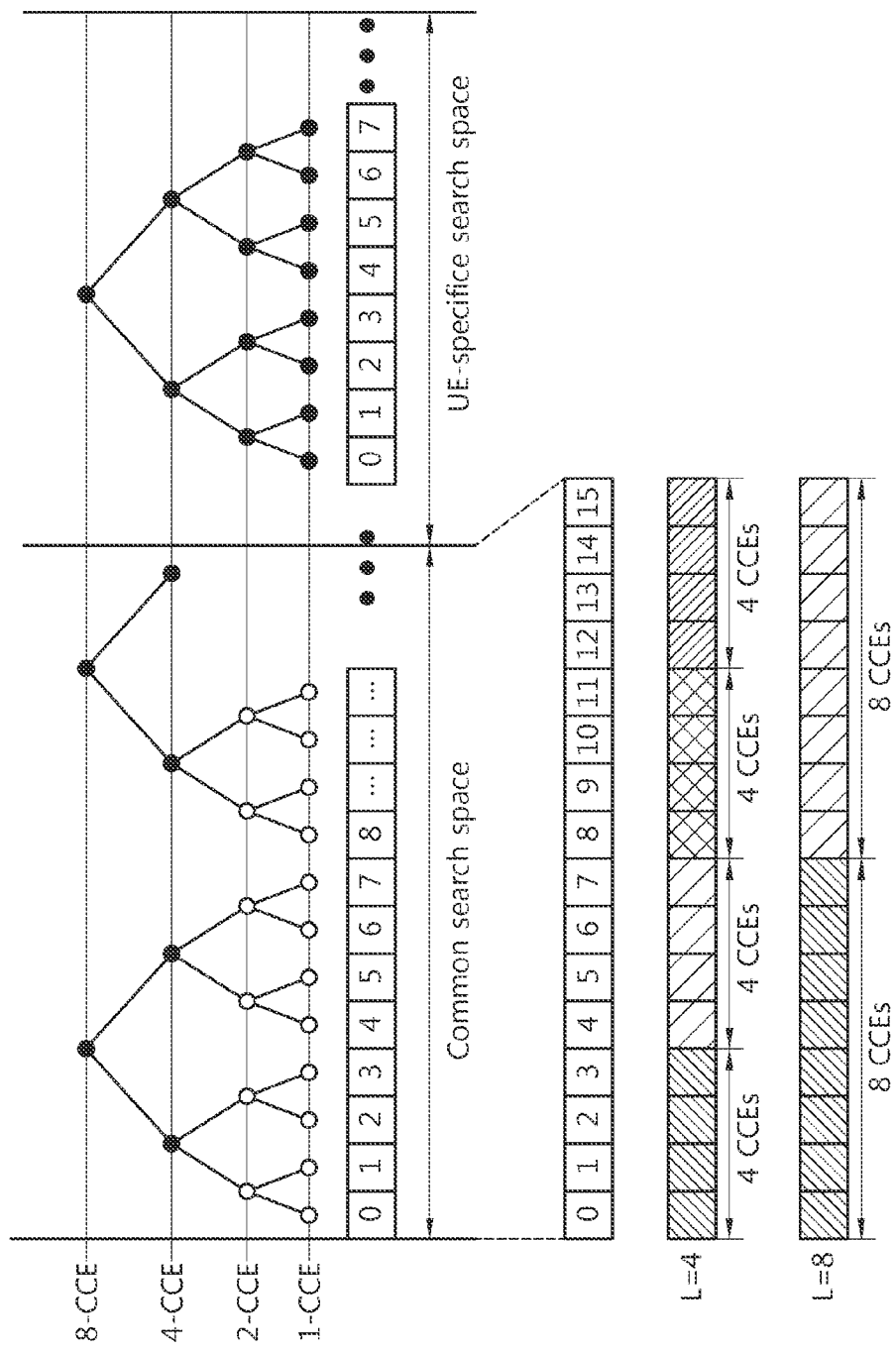
FIG. 7 is an exemplary diagram showing the monitoring of a PDCCH.

FIG. 7 shows exemplary monitoring of a PDCCH. This can refer to the section 9 of 3GPP TS 36.213 V8.5.0 (December 2008). The 3GPP LTE uses blind decoding for PDCCH detection. In the blind decoding, a specific identifier is de-masked from a CRC of a PDCCH (referred to as a candidate PDCCH), and then CRC error checking is performed to determine whether the PDCCH is a control channel of an entity performing the blind decoding. A UE has no information about which position in the control region the PCDDH of the UE is transmitted from and which CCE aggregation level or DCI format is used for the transmission.

A plurality of PDCCHs can be transmitted in one subframe. A UE monitors a plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space may be referred to as a monitoring set of CCEs for PDCCH. The UE monitors the PDCCH in the corresponding search space.

The search space is classified into a common search space and a UE-specific search space. The common search space is a space for searching for a PDCCH having common control information and consists of 16 CCEs indexed with 0 to 15. The common search space supports a PDCCH having CCE aggregation levels of {4, 8}. In the common search space, however, a PDCCH for UE-specific control information (e.g. DCI format 0, 1A) can also be transmitted. The UE-specific search space supports a PDCCH having CCE aggregation levels of {1, 2, 4, 8}.

Table 1 shows the number of PDCCH candidates to be monitored by a UE.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A,1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space is defined in the Table 1, and the starting position of the search space is different between the UE-specific search space and common search space. The starting position of the common search space is fixed regardless of subframe, but the starting position of the UE-specific search space may be determined every subframe and may be obtained based on a UE's identifier (e.g., C-RNTI), a CCE aggregation level and/or the slot number in the subframe. The UE-specific search space may be overlapped with the common search space if the starting position of the UE-specific search space is in the common search space.

In a aggregation level L∈{1, 2, 3, 4}, a search space $S^{(L)}_k$ is defined as a set of PDCCH candidates. A CCE corresponding to a PDCCH candidate m of the search space S(L)k is expressed as shown:

$$L \cdot \{(Y_k + m) \bmod \lfloor N_{CCE,k}/L \rfloor\} + i, \quad \text{[Equation 1]}$$

where i=0, 1, ..., L−1, m=0, ..., $M^{(L)}$−1 and $N_{CCE,k}$ is the total number of CCEs that can be used for transmission of PDCCHs in the control region of a subframe k. The control region includes a set of CCEs numbered from 0 to $N_{CCE,k}$−1. $M^{(L)}$ is the number of PDCCH candidates from a CCE aggregation level L in a given search space. In a common search space, $Y_k$ is set to zero for two aggregation levels of L=4 and L=8. In the UE-specific search space of the aggregation level L, the variable $Y_k$ is defined as shown:

$$Y_k = (A \cdot Y_{k-1}) \bmod D, \quad \text{[Equation 2]}$$

where $Y_{-1} = n_{RNTI} \neq 0$; A=39827; D=65537; k=floor($n_s/2$); and $n_s$ is the slot number in a radio frame.

When the UE monitors the PDCCH by using a C-RNTI, the DCI format and the search space to be monitored are determined according to a transmission mode of the PDSCH. The following table shows an example of PDCCH monitoring where a C-RNTI is allocated.

TABLE 2

| Transmission mode | DCI Format | Search Space | Transmission mode of PDSCH according to PDCCH |
|---|---|---|---|
| Mode 1 | DCI Format 1A | Common and UE-Specific | Single antenna port, port 0 |
| | DCI Format 1 | UE-Specific | Single antenna port, port 1 |
| Mode 2 | DCI Format 1A | Common and UE-Specific | Transmit diversity |
| | DCI Format 1 | UE-Specific | Transmit diversity |
| Mode 3 | DCI Format 1A | Common and UE-Specific | Transmit diversity |
| | DCI Format 2A | UE-Specific | CDD (Cyclic Delay Diversity) or Transmit diversity |
| Mode 4 | DCI Format 1A | Common and UE-Specific | Transmit diversity |
| | DCI Format 2 | UE-Specific | Closed-loop spatial multiplexing |
| Mode 5 | DCI Format 1A | Common and UE-Specific | Transmit diversity |
| | DCI Format 1D | UE-Specific | MU-MIMO (Multi-user Multiple Input Multiple Output) |
| Mode 6 | DCI Format 1A | Common and UE-Specific | Transmit diversity |
| | DCI Format 1B | UE-Specific | Closed-loop spatial multiplexing |
| Mode 7 | DCI Format 1A | Common and UE-Specific | If the number of PBCH transmission ports is 1, single antenna port, port 0; otherwise, transmit diversity |
| | DCI Format 1 | UE-Specific | Single antenna port, port 5 |
| Mode 8 | DCI Format 1A | Common and UE-Specific | If the number of PBCH transmission ports is 1, single antenna port, port 0; otherwise, transmit diversity |
| | DCI Format 2B | UE-Specific or | Dual layer transmission (port 7 or 8) or single antenna port, port 7 or 8 |

Table 3 illustrates the usage of DCI format.

TABLE 3

| DCI Format | Description |
|---|---|
| DCI Format 0 | Used for PUSCH scheduling |
| DCI Format 1 | Used for scheduling of one PDSCH codeword |
| DCI Format 1A | Used for compact scheduling of one PDSCH codeword and random access process |
| DCI Format 1B | Used for compact scheduling of one PDSCH codeword having free-coding information |
| DCI Format 1C | Used for very compact scheduling of one PDSCH codeword |
| DCI Format 1D | Used for compact scheduling of one PDSCH codeword having free-coding and power offset information |
| DCI Format 2 | Used for PDSCH scheduling of UEs configured as closed loop spatial multiplexing |
| DCI Format 2A | Used for PDSCH scheduling of UEs configured as open-loop spatial multiplexing |
| DCI Format 3 | Used for transmission of TPC command of PUCCH and PUSCH having two-bit power adjustment |
| DCI Format 3A | Used for transmission of TPC command of PUCCH and PPUSCH having one-bit power adjustment |

Now, a multiple carrier system will be described.
Now, a multiple carrier system will be described.

The 3GPP LTE system supports a case where downlink bandwidth and uplink bandwidth are set differently under the premise that one component carrier (CC) is used. This implies that the 3GPP LTE is supported only for a case where the downlink bandwidth and the uplink bandwidth are equal to or different from each other in a situation where one CC is defined for each of a downlink and an uplink. For example, the 3GPP LTE may support up to 20 MHz, and supports only one CC for the uplink and the downlink even if the uplink bandwidth and the downlink bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with legacy systems. For example, when five CCs are assigned with a granularity of a carrier unit having bandwidth of 20 MHz, bandwidth of up to 100 MHz can be supported.

The spectrum aggregation can be classified into contiguous spectrum aggregation achieved between consecutive carriers in frequency domain and non-contiguous spectrum aggregation achieved between discontinuous carriers. The number of carriers aggregated in downlink may be different from the number of carriers aggregated in uplink. Symmetric aggregation is achieved when the number of downlink carriers is equal to the number of uplink carriers. Asymmetric aggregation is achieved when the number of downlink carriers is different from the number of uplink carriers.

CCs may have different sizes (i.e., bandwidths). For example, when five CCs are used to configure a band of 70 MHz, the band can be composed of 5 MHz carrier (CC #0)+20 MHz carrier (CC #1)+20 MHz carrier (CC #2)+20 MHz carrier (CC #3)+5 MHz carrier (CC #4).

Figure 8:
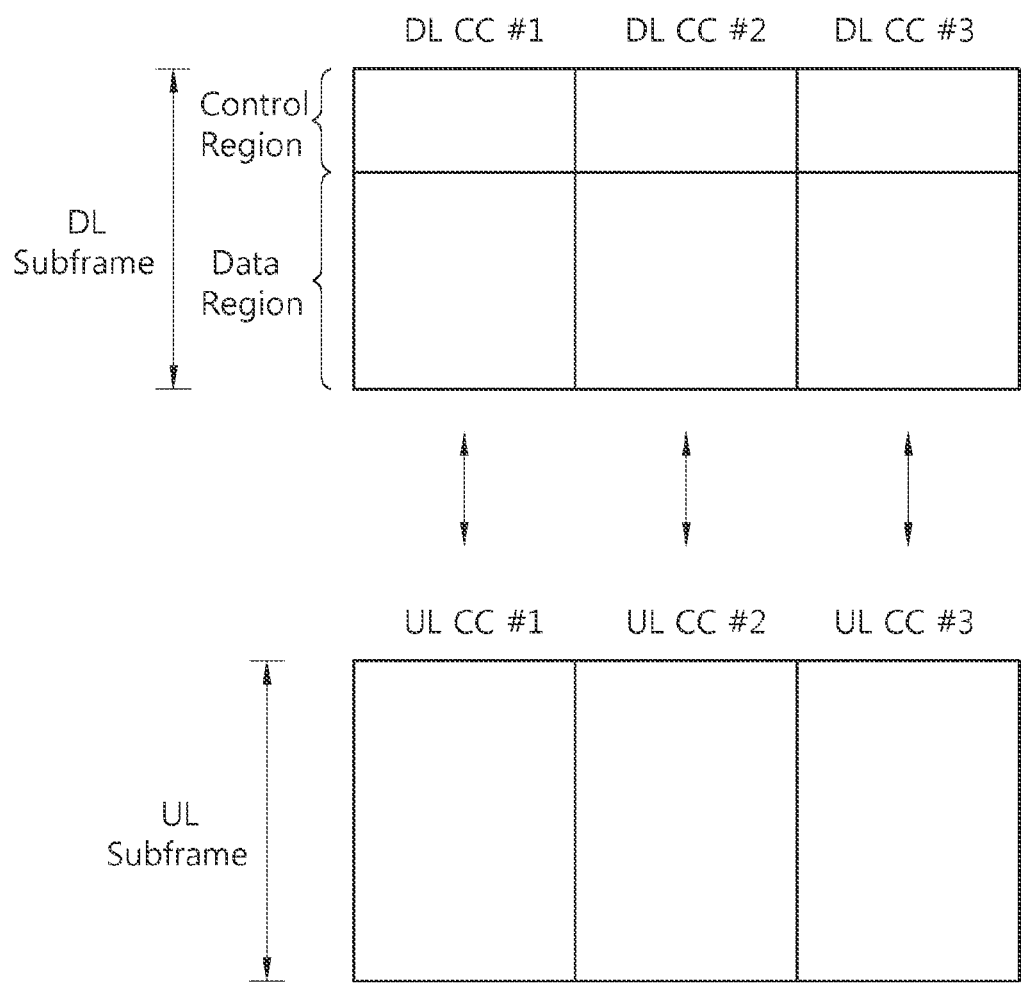
FIG. 8 is one example of multiple carriers.

FIG. 8 is one example of multiple carriers. The example shows three DL CCs and UL CCs respectively, but is not limited to the number above. Each DL CC transmits a PDCCH and a PDSCH independently; and each UL CC transmits a PUCCH and a PUSCH independently.

Hereinafter, a multiple carrier system implies a system supporting multiple carriers based on spectrum aggregation. In a multiple carrier system, contiguous spectrum aggregation and/or non-contiguous spectrum aggregation can be used; also, either of symmetric aggregation and asymmetric aggregation can be used.

In a multiple carrier system, a linkage can be defined between a DL CC and a UL CC. A linkage can be configured through EARFCN information included in downlink system information and is configured by using a fixed relationship between DL/UL Tx/Rx separation. A linkage implies a relationship mapping between a DL CC through which a PDCCH carrying a UL grant is transmitted and a UL CC using the UL grant. Also, a linkage may imply a relationship mapping between a DL CC (or UL CC) through which data for HARQ are transmitted and a UL CC (or DL CC) through which HARQ ACK/NACK signal is transmitted. A BS can inform a UE of linkage information as part of a upper layer message such as RRC message or as part of system information. The linkage between a DL CC and a UL CC can be fixed but can be varied between cells/UEs.

Separate coding refers to a case where a PDCCH can carry control information regarding a resource assignment for a PDSCH/PUSCH corresponding to one carrier. That is, the PDCCH and the PDSCH; and the PDCCH and the PUSCH correspond to each other in the one-to-one manner. Joint coding refers to a case where one PDCCH can carry a resource assignment for PDSCHs/PUSCHs of a plurality of CCs. One PDCCH can be transmitted through one CC or through a plurality of CCs.

For clarity, PDCCH-PDSCH relation for downlink transmission is disclosed herein for separate coding but the present invention can be applied to PDCCH-PUSCH relationship for uplink transmission.

In a multiple carrier system, two methods can be used for CC scheduling.

In a first method, a pair of PDCCH-PDSCH is transmitted from one CC. This CC is referred to as a self-scheduling CC, which implies that a UL CC through which a PUSCH is transmitted becomes a CC linked to a DL CC through which the corresponding PDCCH is transmitted. In other words, the PDCCH either allocates a PDSCH resource on the same CC or allocates a PUSCH resource on the linked UL CC.

In a second method, independently of a DL CC through which a PDCCH is transmitted, determined is a DL CC through which a PDSCH is transmitted or a UL CC through which a PUSCH is transmitted. That is, the PDCCH and the PDSCH are transmitted from separate DL CCs or a PUSCH is transmitted through a UL CC not linked to the DL CC through which the PDCCH is transmitted, which is referred to as cross-carrier scheduling. The CC through which the PDCCH is transmitted is called a PDCCH cross-carrier, a monitoring cross-carrier, or a scheduling cross-carrier; the CC through which the PDSCH/PUSCH is transmitted is called a PDSCH/PUSCH cross-carrier or a scheduled cross-carrier.

Cross-carrier scheduling can be activated/deactivated for each UE and a cross-carrier scheduling activated UE can receive DCI in which a CIF is included. The UE can figure out which scheduled CC the control information is about, to which the PDCCH received from a CIF included in the DCI correspond.

A DL-UL linkage predefined by the cross-carrier scheduling can be overridden. That is, the cross-carrier scheduling can be used to schedule a different CC rather than the linked CC irrespective of the DL-UL linkage.

Figure 9:
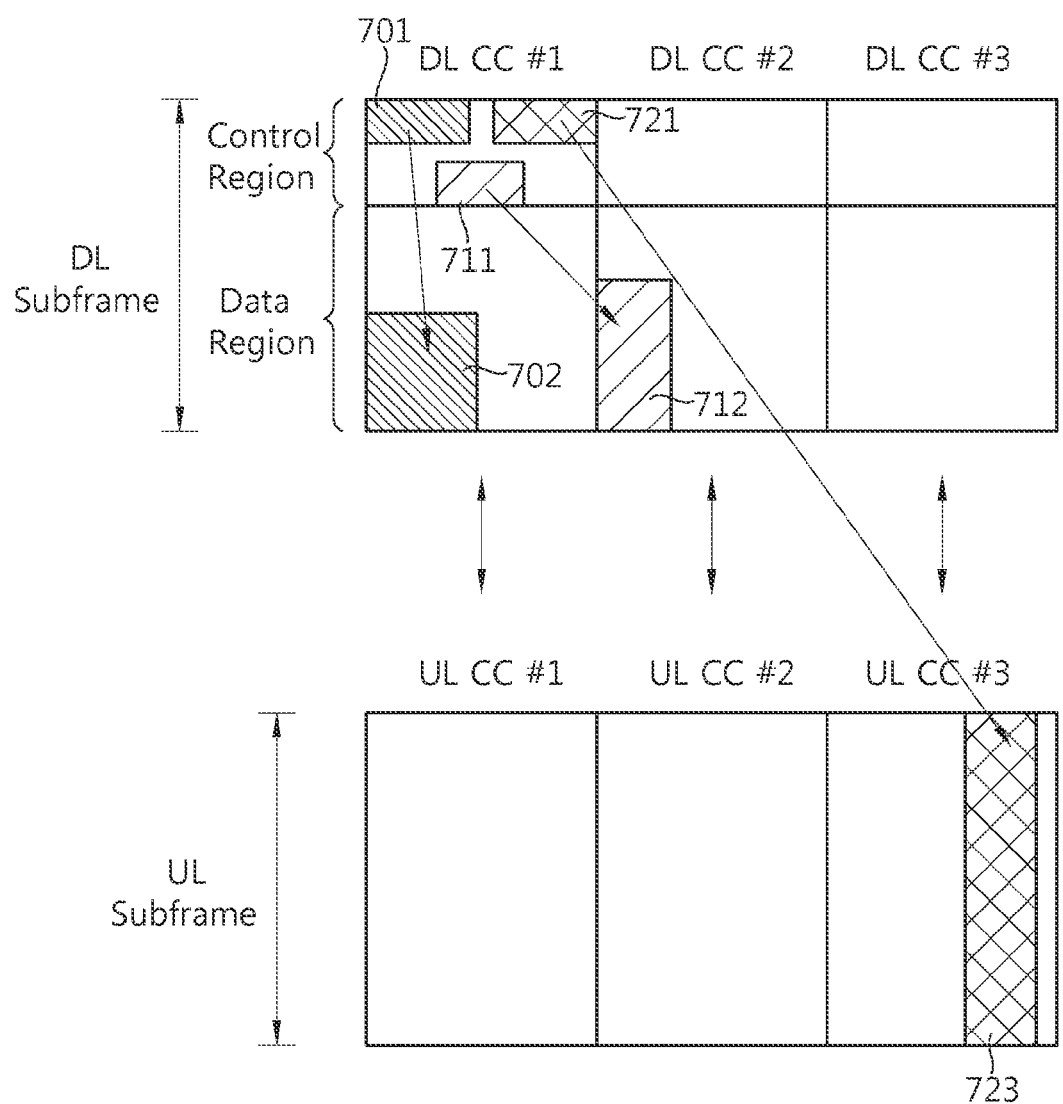
FIG. 9 is one example of cross-carrier scheduling.

FIG. 9 is one example of cross-carrier scheduling. It is assumed that DL CC #1 is linked to UL CC #1; DL CC #2 is linked to UL CC #2; and DL CC #3 is linked to UL CC #3.

A first PDCCH 701 of DL CC #1 carries DCI about a PDSCH 702 of the same DL CC #1. A second PDCCH 711 of the DL CC #1 carries DCI about a PDSCH 712 of DL CC #2. A third PDCCH 721 of the DL CC #1 carries DCI about a PUSCH 722 of UL CC #3 which is not set up for linkage.

For cross-carrier scheduling, the DCI of a PDCCH can include a carrier indicator field (CIF). A CIF indicates a DL CC or a UL CC scheduled through the DCI. For example, the second PDCCH 711 can include a CIF indicating the DL CC #2. The third PDCCH 721 can include a CIF indicating the UL CC #3.

Also, the CIF of the third PDCCH 721 can take a CIF value corresponding to a DL CC rather than the CIF value corresponding to a UL CC. In other words, as the CIF of the third PDCCH 721 indicates the DL CC #3 linked to the UL CC #3, the PUSCH can indirectly indicate a scheduled UL CC #3. It is because if the DCI of a PDCCH includes PUSCH scheduling and the CIF indicates a DL CC, a UE can determine that the above situation corresponds to the PUSCH scheduling on a UL CC linked to a DL CC. Therefore, by using a CIF having a limited bit length (e.g., a CIF having three-bit length), a larger number of CCs can be indicated than a method for informing of all the DL/UL CCs.

A UE using cross-carrier scheduling is required to monitor a PDCCH of a plurality of scheduled CCs with respect to the same DCI format in a control region of one scheduling CC. For example, if a plurality of DL CCs have different transmission modes, each DL CC can monitor a plurality of PDCCHs having different DCI formats. Even if the same transmission mode is used for the plurality of DL CCs, as long as the bandwidth of each DL CC varies from one another, the size of payload of the DCI format is different under the same DCI format and a plurality of PDCCHs can be monitored.

Consequently, if cross-carrier scheduling is possible, a UE is required to monitor a PDCCH for a plurality of DCI in the control region of a monitoring CC according to the transmission mode and/or the bandwidth of each CC. Therefore, it is required to construct a search space which can support the PDCCH monitoring and to monitor the PDCCH.

First, in a multiple carrier system, the following terminologies are defined.

A UE DL CC set: a set of DL CCs scheduled for a UE to receive a PDSCH.

A UE UL CC set: a set of UL CCs scheduled for a UE to transmit a PUSCH.

A PDCCH monitoring set: A set of at least one DL CC performing PDCCH monitoring. A PDCCH monitoring set may be the same as the UE DL CC set or a subset of the UE DL CC set. A PDCCH monitoring set can include at least one of DL CCs in the UE DL CC set. Similarly, a PDCCH monitoring set can be defined separately independent of the UE DL CC set. A DL CC included in the PDCCH monitoring set can be configured such that self-scheduling for a linked UL CC is always possible.

The UE DL CC set, the UE UL CC set, and the PDCCH monitoring set can be configured to be cell-specific or UE-specific.

Figure 10:
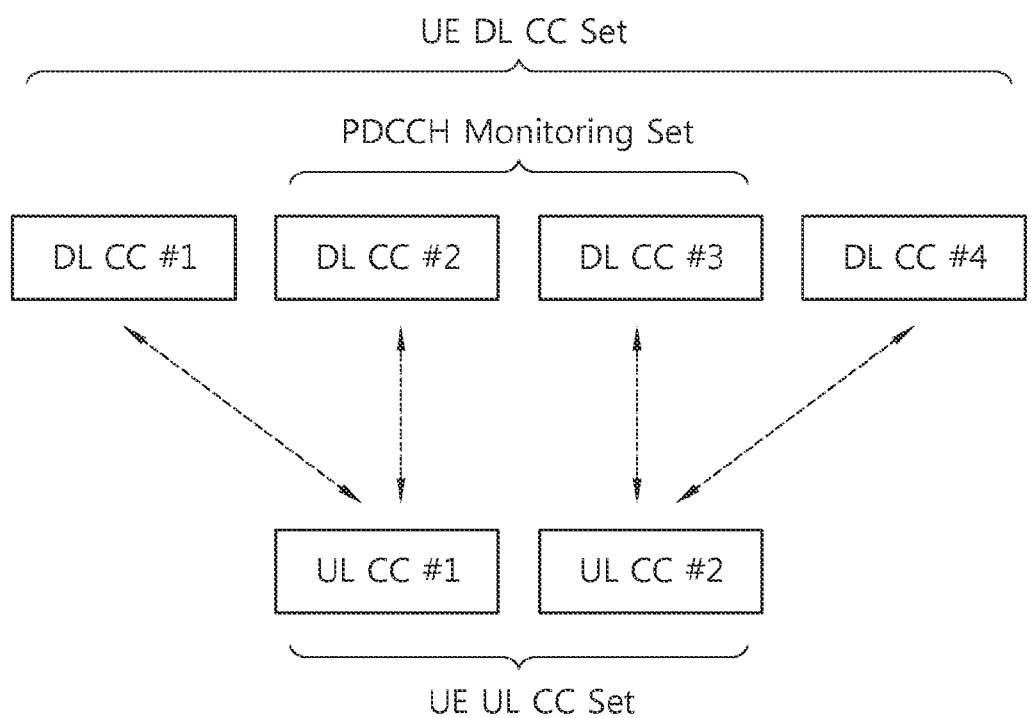
FIG. 10 is one example of a set of CCs.

FIG. 10 is one example of a set of CCs. It is assumed that four DL CCs (DL CC #1, #2, #3, #4) from the UE DL CC set are allocated to a UE; two UL CCs (UL CC #1, #2) from the UE UL CC set are allocated to the UE; and two DL CCs (DL CC #2, #3) from the PDCCH monitoring set are allocated to the UE.

The DL CC #2 in the PDCCH monitoring set transmits a PDCCH about a PDSCH of the DL CC #1/#2 in the UE DL CC set and a PDCCH about a PUSCH of the UL CC #1 in the UE UL CC set. The DL CC #3 in the PDCCH monitoring set transmits a PDCCH about a PDSCH of the DL CC #3/#4 in the UE DL CC set and a PDCCH about a PUSCH of the UL CC #2 in the UE UL CC set.

A linkage can be established among CCs included in the UE DL CC set, the UE UL CC set, and the PDCCH monitoring set. In the example of FIG. 10, a PDCCH-PDSCH linkage is established between a scheduling CC, DL CC #2 and a scheduled CC, DL CC #1; and a PDCCH-PUSCH linkage is established between DL CC #2 and UL CC #1. Also, a PDCCH-PDSCH linkage is established between a scheduling CC, DL CC #3 and a scheduled CC, DL CC #4; and a PDCCH-PUSCH linkage is established between DL CC #3 and UL CC #2. A BS can inform the UE of information about the scheduling CC or the PDCCH-PDSCH/PUSCH linkage information through cell-specific signaling or terminal-specific signaling.

On the other hand, for the respective DL CCs in the PDCCH monitoring set, a DL CC and a UL CC may not be linked to each other. After linking a DL CC in the PDCCH monitoring set to a DL CC in the UE DL CC set, a UL CC for PUSCH transmission can be limited to a UL CC linked to a DL CC in the UE DL CC set.

A CIF can be set differently according to linkage of the UE DL CC set, the UE UL CC set, and the PDCCH monitoring set.

Figure 11:
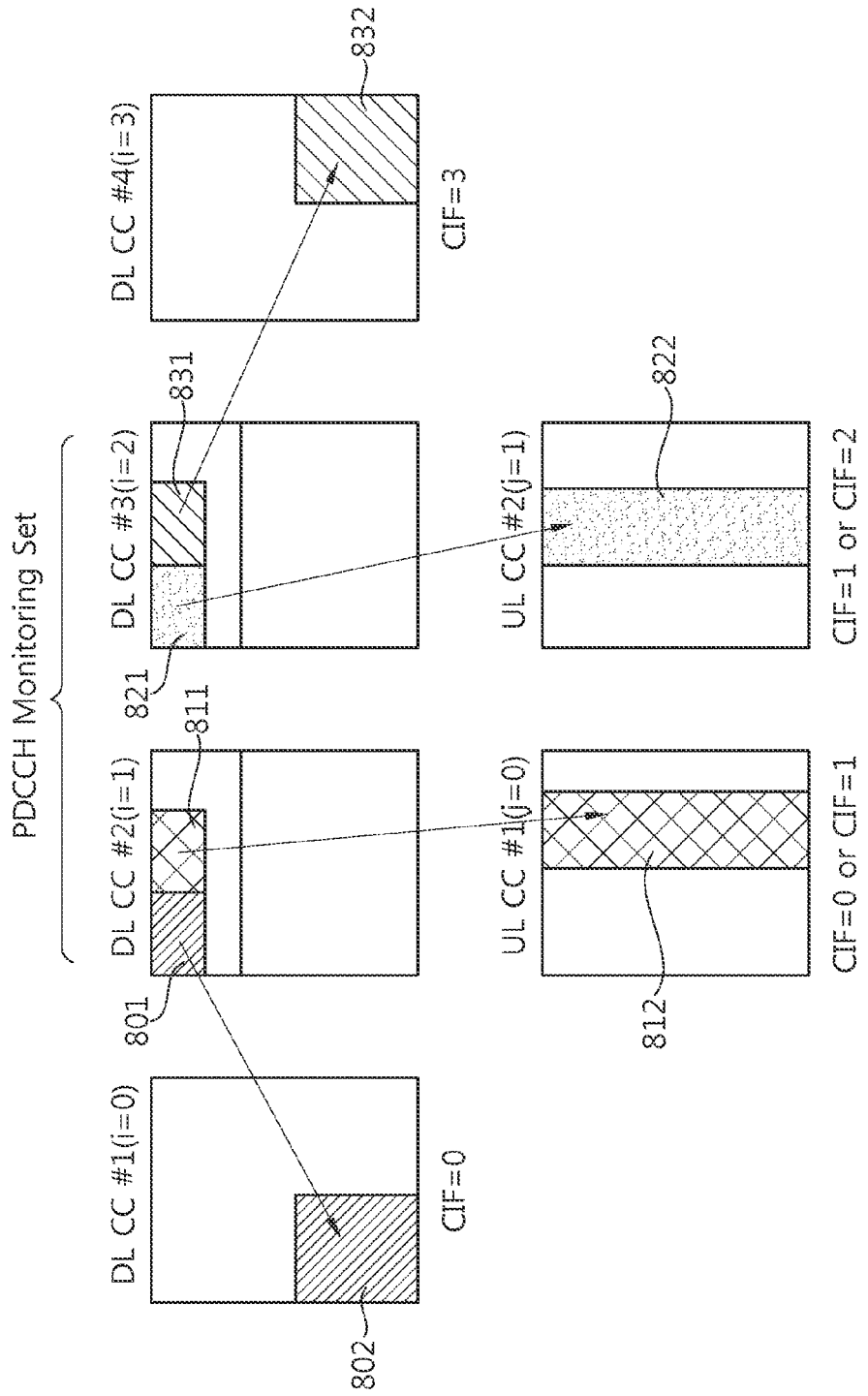
FIG. 11 is one example of CIF setting.

FIG. 11 is one example of CIF setting. The example shows four DL CCs indexed with 0 to 3, denoted by i. The example also includes two UL CCs indexed with 0 and 1, denoted by j. Linkage for the UE DL CC set, the UE UL CC set, and the PDCCH monitoring set is the same as the example of FIG. 10.

A first PDCCH 801 of the DL CC #2 indicates the PDSCH 802 of the DL CC #1. The CIF in the first PDCCH 801 is 0, indicating the index of the DL CC #1.

A second PDCCH 811 of the DL CC #2 indicates the PUSCH 812 of the UL CC #1. The CIF in the second PDCCH 811 is 0, indicating the index of the UL CC #1. If DLCC and ULCC have a CIF value independent of each other, the CIF value is configured to be 0 to indicate the UL CC #1. Additionally, a flag field indicating whether a received DCI is a downlink grant or an uplink grant can be included in the second PDCCH 811. Similarly, the CIF in the second PDCCH 811 may indicate the DL CC linked to the UL CC #1. Since the UL CC #1 is linked to the DL CC #1 or the DL CC #2 herein, the CIF in the second PDCCH 811 is either zero, indicating the DL CC #1 linked to the UL CC #1 or one, indicating the DL CC #2 linked to the UL CC #1. A UE can figure out that the second PDCCH 811 includes an uplink grant and corresponds to a PDCCH about the UL CC #1 linked to the DL CC #1 or the DL CC #2.

If the CIF is configured to indicate a DL CC linked to a UL CC, the CIF doesn't have to indicate the index of the UL CC but is configured to always indicate the index of the DL CC. Therefore, it may be argued that the index of a UL CC is determined according the index of a linked DL CC. A UE can figure out whether the CIF indicates a DL CC or a DL CC linked to a UL CC according to whether a resource assignment in the PDCCH is a downlink grant or an uplink grant.

A first PDCCH 821 of the DL CC #3 indicates a PDSCH 822 of the UL CC #2. The CIF in the first PDCCH 821 is set to be 1, indicating the index of the UL CC #2; or it can be set to be 2 (or 3), indicating the DL CC #3 (or the DL CC #4) linked to the UL CC #2.

A second PDCCH 831 of the DL CC #3 indicates a PDSCH 832 of the DL CC #4. The CIF in the first PDCCH 831 is 3, indicating the index of the DL CC #4.

Figure 12:
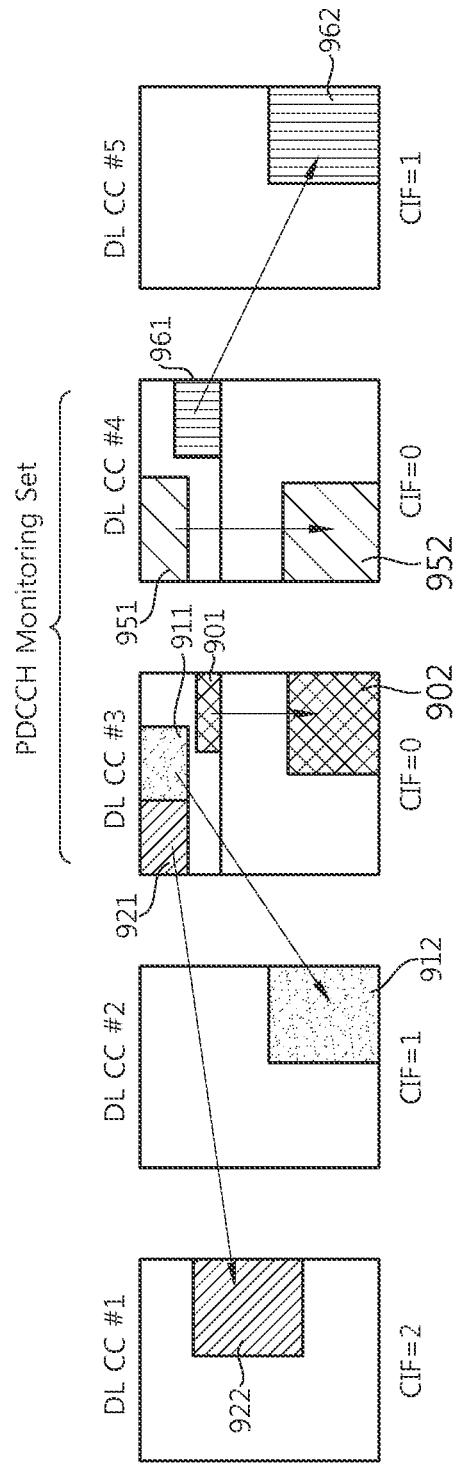
FIG. 12 is another example of CIF setting.

FIG. 12 is another example of CIF setting. FIG. 12 includes five DL CCs and a PDCCH monitoring set includes DL CC #3 and DL CC #4. Different from the embodiment of FIG. 11, the CIF has a relative index value with respect to a monitoring CC through which a PDCCH is transmitted. In other words, different from the embodiment of FIG. 11, where the CIF value for a DL CC #1, #2, #3, and #4 was assigned 0, 1, 2, and 3 independent of a monitoring CC through which the PDCCH is transmitted and the PDCCH-PDSCH/PUSCH linkage, a relative CIF value is assigned to each DL CC with respect to the monitoring CC.

A scheduled DL CC linked to the DL CC #3 is DL CC #1, DL CC #2, and DL CC #3. DL CC #3, #1, and #2 are assigned with 0, 1, and 2, respectively as an index for CIF. The scheduled DL CC linked to the DL CC #4 is DL CC #4 and DL CC #5. Therefore, the DL CC #4 and #5 are assigned with 0 and 1 as an index for CIF.

In the figure, the CIF value is assigned to each scheduling CC in the ascending order with respect to a monitoring CC, but the CIF can also be assigned in the descending order.

A first PDCCH 901 of the DL CC #3 indicates a PDSCH 902 of the DL CC #3. The CIF in the first PDCCH 901 is 0. A second PDCCH 911 of the DL CC #3 indicates a PDSCH 912 of the DL CC #2. The CIF in the second PDCCH 911 is 1. A third PDCCH 921 of the DL CC #3 indicates a PDSCH 922 of the DL CC #1. The CIF in the third PDCCH 921 is 2.

A first PDCCH 951 of the DL CC #4 indicates a PDSCH 952 of the DL CC #4. The CIF in the PDCCH 951 is 0. A second PDCCH 961 of the DL CC $4 indicates a PDSCH 962 of the DL CC #5. The CIF in the second PDCCH 961 is 1.

By setting the CIF value with respect to a monitoring CC, the CIF can indicate all the DL CCs with a smaller number of bits than the number of bits representing the total number of DL CCs.

As described above, a method for assigning a CIF value independently for a PDCCH monitoring CC and a DL-UL linkage provides an advantage that much more CCs can be indicated by using a CIF having a limited bit length.

A monitoring CC can also be used as a reference for the CIF to indicate a UL CC for a PUSCH. In a similar way, the UL CC can be indicated indirectly as the CIF indicates a DL CC linked as described above.

Now, an extended search space according to an embodiment of the present invention will be described.

As shown in Table 1, in the 3GPP LTE system, a UE-specific search space defines six PDCCH candidates for each of the aggregation levels 1 and 2; and defines two PDCCH candidates for each of the aggregation levels 4 and 8. A common search space defines four PDCCH candidates for the aggregation level 4 and two PDCCH candidates for the aggregation level 8. This configuration is based on a single carrier and assumes that case where the same CC is used for transmission of the PDCCH-PDSCH.

In a multiple carrier system capable of cross-carrier scheduling, since multiple PDCCHs to be received by one UE can be transmitted through a single DL CC, chances are that the multiple PDCCHs may not be scheduled or a PDCCH blocking probability becomes high if only the number of existing PDCCH candidates is considered. It is because the number of PDCCHs that can be transmitted to a single DL CC is limited due to the number of PDCCH candidates although a more number of PDCCHs should be transmitted than the existing 3GPP LTE. Accordingly, flexibility for scheduling multiple PDCCHs may be degraded and the PDCCH blocking probability may be increased. The PDCCH blocking probability denotes a probability that PDCCH scheduling is not performed as search spaces for multiple UEs overlap.

Moreover, in a multi-cell environment such as a heterogeneous network, if a PDCCH-less CC is incorporated for interference coordination, it is probable that a large number of PDCCHs are concentrated on a particular DL CC. Thus, it may be difficult to accommodate scheduling a larger number of PDCCHs in a control region for a given size of a search space.

In a multiple carrier system, an extended search space is disclosed for extending the size of an insufficient search space when cross-carrier scheduling is employed.

If cross-carrier scheduling is used, multiple PDCCHs for one UE can be transmitted from a single DL CC. To secure a UE-specific search space needed for this purpose, size of the search space can be increased by increasing the number of PDCCH candidates for each aggregation level, which is referred to as an extended search space compared with the previous search space.

The following Tables 4 and 5 show examples of an increased search space.

TABLE 4

| Search Space Type | Aggregation Level L | Size [in CCEs] | Number of PDCCH candidates |
|---|---|---|---|
| UE-specific | 1 | 12 | 12 |
| | 2 | 24 | 12 |
| | 4 | 16 | 4 |
| | 8 | 32 | 4 |

TABLE 5

| Search Space Type | Aggregation Level L | Size [in CCEs] | Number of PDCCH candidates |
|---|---|---|---|
| UE-specific | 1 | 10 | 10 |
| | 2 | 20 | 10 |
| | 4 | 12 | 3 |
| | 8 | 24 | 3 |

In the above tables, the number of PDCCH candidates and size of the search space are examples introduced only for the description of embodiments.

Increase in the number of PDCCH candidates implies that an increased search space is provided. The increase of the number of PDCCH candidates for each aggregation level can be varied depending on carrier aggregation capability of each UE, blind decoding capability, and configuration due to a UE category and/or an upper layer.

Size of a search space can be varied according to UE-specific signaling such as RRC message and/or carrier allocation information. Alternatively, size of a search space can be varied according to the number of DL CCs included in a UE DL CC set, the number of UL CCs included in a UE UL CC set, and DL-UL linkage. Size of a search space can be varied depending on whether a particular DL CC can transmit both of an uplink grant and a downlink grant; or whether only one of the two grants can be transmitted.

Now, it is assumed that the number of DL CCs in a UE DL CC set is N, and the number of UL CCs in a UE UL CC set is M. A BS can inform a UE of N and M through RRC signaling.

Table 6 is one example where size of a search space is varied.

TABLE 6

| Search Space Type | Aggregation Level L | Size [in CCEs] | Number of PDCCH candidates |
|---|---|---|---|
| UE-specific | 1 | $1 \times 6 \times C$ | $6 \times C$ |
| | 2 | $2 \times 6 \times C$ | $6 \times C$ |
| | 4 | $4 \times 6 \times C$ | $2 \times C$ |
| | 8 | $8 \times 6 \times C$ | $2 \times C$ |

The C can be defined based on N and M. For example, C can be set to be the larger of N and M. As another example, if $N \geq M$ is always satisfied, a relationship of $C=N$ can be established. In yet another example, C can be determined such as $C=N+M$. In still another example, C can be determined to be dependent on at least one of carrier aggregation capability, blind decoding capability, and a UE category.

Table 7 is one example where size of a search space is varied by using arbitrary parameters i and j.

TABLE 7

| Search Space Type | Aggregation Level L | Size [in CCEs] | Number of PDCCH candidates |
|---|---|---|---|
| UE-specific | 1 | $1 \times i \times C$ | $i \times C$ |
| | 2 | $2 \times i \times C$ | $i \times C$ |
| | 4 | $4 \times j \times C$ | $j \times C$ |
| | 8 | $8 \times j \times C$ | $j \times C$ |

The i and j can be determined to be dependent on at least one of carrier aggregation capability, blind decoding capability, and a UE category.

If it is assumed that a PDCCH monitoring set, a linked UE DL CC set, and/or a UE UL CC set are available, an extended search space can be defined more efficiently based on linkage.

If it is assumed that $Q_m$ is the total number of CCs in a PDCCH monitoring set; $Q_d$ is the total number of CCs in a UE DL CC set; and $Q_u$ is the total number of CCs in a UE UL CC set; and q is a CC index in the PDCCH monitoring set, $q=0, 1, \ldots, Q_m-1$.

Table 8 is one example where size of a search space is varied by using a parameter X.

TABLE 8

| Search Space Type | Aggregation Level L | Size [in CCEs] | Number of PDCCH candidates |
|---|---|---|---|
| UE-specific | 1 | $1 \times 6 \times X$ | $6 \times X$ |
| | 2 | $2 \times 6 \times X$ | $6 \times X$ |
| | 4 | $4 \times 2 \times X$ | $2 \times X$ |
| | 8 | $8 \times 2 \times X$ | $2 \times X$ |

X can be defined such that $X=\text{round}(Q_d/Q_m)$, $X=\text{ceil}(Q_d/Q_m)$, or $X=\text{floor}(Q_d/Q_m)$. round(x) is a function that rounds off to the nearest integer. ceil(x) is a function that returns the minimum value from integers larger than or equal to x. floor(x) is a function that returns the maximum value from integers smaller than or equal to x.

Table 9 is one example where size of a search space is varied by using arbitrary parameters i and j.

TABLE 9

| Search Space Type | Aggregation Level L | Size [in CCEs] | Number of PDCCH candidates |
|---|---|---|---|
| UE-specific | 1 | $1 \times i \times X$ | $i \times X$ |
| | 2 | $2 \times i \times X$ | $i \times X$ |
| | 4 | $4 \times j \times X$ | $j \times X$ |
| | 8 | $8 \times j \times X$ | $j \times X$ |

The i and j are constants used to define an extended search space.

X can be defined for each monitoring CC in a PDCCH monitoring set. Now, it is assumed that X of a monitoring CC having an index q is $X_q$. $X_q$ may be the number of PDSCH CCs that can be scheduled by the q-th PDCCH CC. X in the Table 8 and 9 can be replaced with $X_q$. $X_q$ can be expressed by the number of DL CCs linked to a monitoring CC having an index q or the number of UL CCs linked to a monitoring CC having an index q. For example, in the configuration of a CC set shown in FIG. 11, a monitoring CC corresponds to DL CC #2 and DL CC #3. If q=0 and 1, respectively, $X_1$=2 and $X_2$=2. In the configuration of a CC set shown in FIG. 12, the monitoring CC is DL Cc #3 and DL CC #4. If q=0 and 1, respectively, $X_1$=3 and $X_2$=2.

Also, Xq can be defined by a DL CC that can be scheduled by a monitoring CC having an index q or a UL CC linkage. If it is assumed that $X^d q$ is the number of DL CCs that can be scheduled by a monitoring CC having an index q; and $X^u q$ is the number of UL CCs that can be scheduled by a monitoring CC having an index q, Xq can be defined such that $Xq=X^d q+X^u q$. Also, Xq can be determined to be the larger of $X^d q$ and $X^u q$. In the configuration of a CC set shown in FIG. 11, $X^d_0$=2, $X^u_0$=1, $X^d_1$=2, and $X^u_1$=1.

By adjusting the number of PDCCH candidates based on the parameter Xq for a monitoring CC, size of an extended search space can be adjusted according to the number of PDCCHs scheduled in the control region.

Size of an extended search space can be expressed by $C \cdot M^{(L)} \cdot L$. C is the number of scheduled CCs that can be scheduled at a PDCCH monitoring CC and $M^{(L)}$ is the number of PDCCH candidates in a CCE aggregation level L.

Now, a method for dividing a search space according to each CC in an extended search space will be described.

An extended search space is a UE-specific search space and its starting point can be defined the same as the existing 3GPP LTE. Since a UE in an extended search space monitors multiple PDCCHs for multiple CCs, the extended search space can be divided for each CC, which is called a sub-search space.

A sub-search space is a search space belonging to the extended search space and used for a UE to monitor a PDCCH for each CC. One sub-search space can be defined for a DL CC and a UL CC linked with each other or separate sub-search space can be defined for the DL CC and the UL CC.

Figure 13:
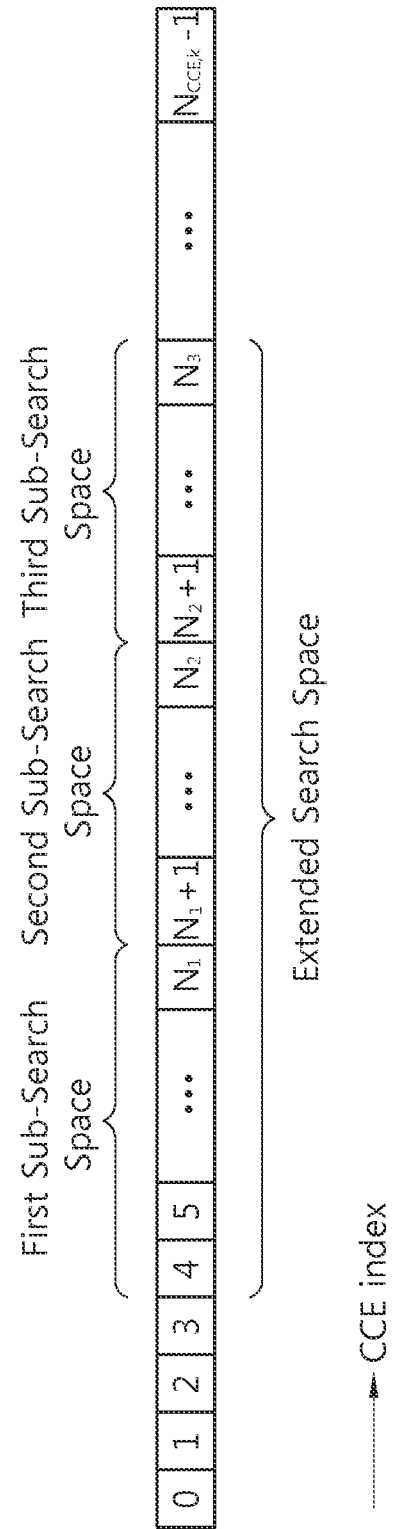
FIG. 13 illustrates extended search space comprising multiple sub-search spaces.

FIG. 13 illustrates extended search space comprising multiple sub-search spaces. Now, it is assumed that an extended search space starts from a CCE having an index 4 from among CCE columns of the k-th subframe.

The extended search space comprises a first sub-search space, a second sub-search space, and a third sub-search space. $N_1$, $N_2$, and $N_3$ are CCE indices determined according to the size of each sub-search space. Each sub-search space is consecutive. Therefore, if it is assumed that a starting point of the foremost, first sub-search space (which is referred to as a reference sub-search space) coincides with the starting point of the extended search space and a UE knows the size of each sub-search space, starting points of the second and the third sub-search space can be known.

A starting point of an extended search space can be defined by Eqs. 1 and 2 in the same as the existing 3GPP LTE. A starting point of a reference sub-search space can be the same as that of the extended search space.

The starting point of the extended search space and the number of sub-search spaces are only examples and are not limited to the above description. An extended search space can comprise multiple sub-search spaces.

Figure 14:
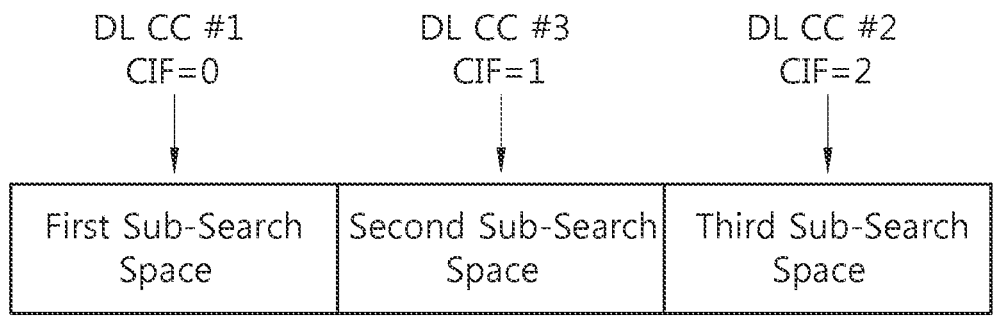
FIG. 14 illustrates an extended search space according to one embodiment of the present invention.

FIG. 14 illustrates an extended search space according to one embodiment of the present invention.

An extended search space comprises a first sub-search space, a second sub-search space, and a third sub-search space. The second sub-search space is defined being separated from the first sub-search space by a first offset f1; and the third sub-search space is defined being separated from the second sub-search space by a second offset f2.

Now, it is assumed that a starting point of an extended search space is a CCE indexed with 20 and size of each sub-search space at a CCE aggregation level 1 is 6 CCE and an offset is 3. If a starting point of a first sub-search space is the same as that of the extended search space, the first sub-search space corresponds to CCEs indexed with 20 to 25. A second sub-search space corresponds to CCEs indexed with 28 to 33. A third sub-search space corresponds to CCEs indexed with 36 to 41.

In this example, an offset corresponds to a space ranging from the end point of the previous sub-search space to the start point of the next sub-search space, but is not limited to the above. An offset can indicate a space ranging from one reference (e.g., start point of the extended search space) to the start point or the end point of the corresponding sub-search space. On the other hand, the offset may be represented as ranging from the start point of the previous sub-search space to the start point of the next sub-search space.

An offset can be a negative integer rather than a positive integer. A negative offset implies that at least two consecutive sub-search space can overlap with each other. A BS can inform a UE based on carrier capability and blind decoding capability of the UE about whether an offset is positive or negative.

Now, interleaving for an extended search space will be described.

Figure 15:
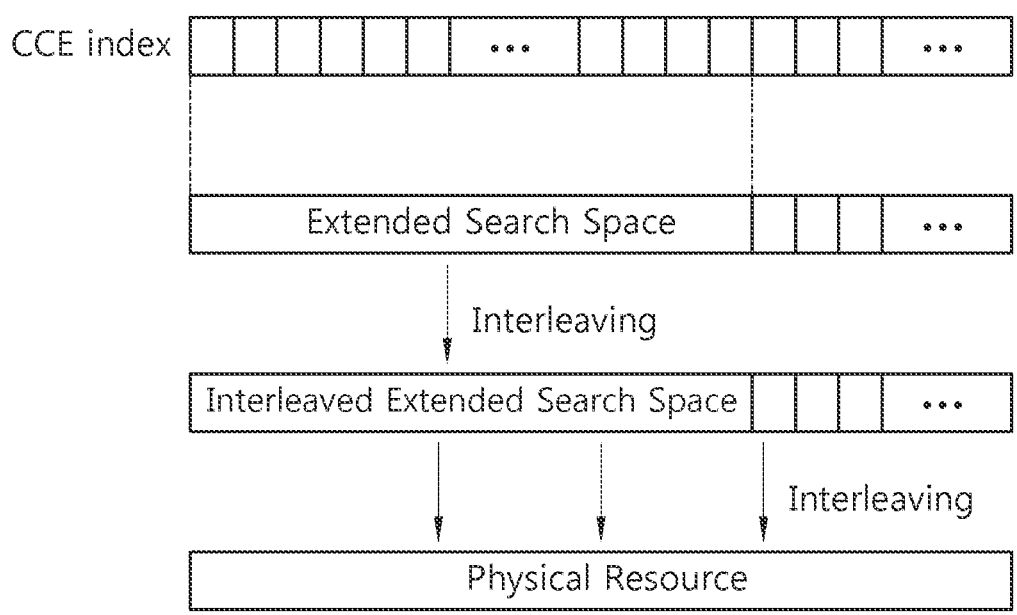
FIG. 15 illustrates interleaving of search spaces according to an embodiment of the present invention.

FIG. 15 illustrates interleaving of search spaces according to an embodiment of the present invention.

An extended search space is defined from the whole of the CCEs that can be used for transmission of a PDCCH within a control region of a subframe. By interleaving CCEs within an extended search space, an interleaved extended search space is configured. This is referred to as first interleaving or logical interleaving. The length of a CCE column for which interleaving is applied may amount to a length including or excluding a common search space.

The whole of the CCEs that includes an interleaved extended search space is interleaved as shown in FIG. 6 and mapped to physical resources. This is referred to as second interleaving or physical interleaving.

An extended search space includes a plurality of sub-search spaces corresponding to a plurality of CCs. A part of CCEs within an extended search space having limited resources or search spaces of UEs may be scheduled in a sub-search space being overlapped with each other; or search spaces of CCs may be scheduled being overlapped with each other. This implies that a PDCCH blocking probability can be increased among UEs or CCs. Therefore, by interleaving CCEs within the extended search space, the PDCCH blocking probability can be lowered.

The number of CCEs included in a control region is determined by bandwidth of a subframe and a CFI value. By dividing the number of CCEs that can be used for PDCCH transmission in an arbitrary subframe by CCE aggregation level L, an interleaved extended search space can be configured for each CCE aggregation level.

When a search space is constructed by using interleaving, the search space can be interleaved by one PDCCH transmission unit according to each CCE aggregation level. For example, The PDCCH transmission unit can be determined by the size of a PDCCH candidate: for example, one CCE at CCE aggregation level 1; two CCEs at CCE aggregation level 2; four CCEs at CCE aggregation level 4; and eight CCEs at CCE aggregation level 8. On the other hand, the interleaving unit may be determined by the unit of the whole of PDCCH candidates rather than one PDCCH transmission unit for each CCE aggregation level, that is, the unit of search space for one CC. Interleaving by the unit of search space for one CC implies that positions of sub-search spaces for the respective CCs in an extended search space can be varied according to individual subframes.

If it is assumed that the number of CCEs included in an extended search space of a k-th subframe, the length IS of an interleaving sequence I(i) at CCE aggregation level L can be determined by IS=ceil($P_k$/L), IS=floor($P_k$/L), or IS=round ($P_k$/L), where i=0, 1, . . . , IS−1. On the other hand, $P_k$ may be determined to be the same as the total number of CCEs used for PDCCH transmission of the k-th subframe $N_{CCE,k}$.

If the number of REs included in an extended search space of a k-th subframe is $R_k$, the length IS of an interleaving sequence I'(i) at CCE aggregation level L can be determined as IS=ceil($R_k$/(36*L)), IS=floor($R_k$/(36*L)), or IS=round($R_k$/ (36*L)).

To clarify the description, in what follows, it is assumed that a start point of an extended search space is CCE index 0 and the extended search space includes three sub-search spaces. However, a start point or size of the extended search space and the number of sub-search spaces within the extended search space are not limited to the description below.

Figure 16:
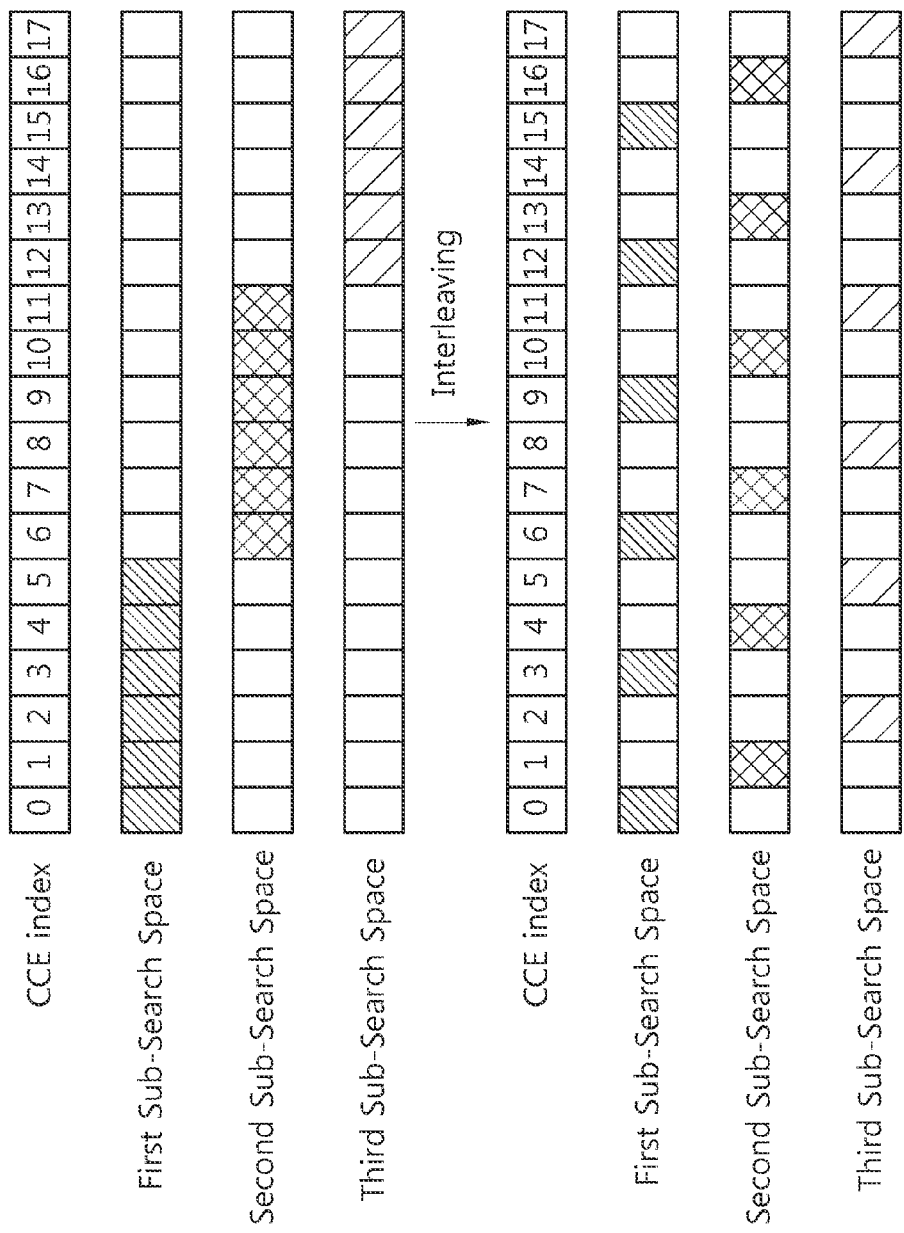
FIG. 16 illustrates interleaving in an extended search space according to one embodiment of the present invention.

FIG. 16 illustrates interleaving in an extended search space according to one embodiment of the present invention.

A UE employing cross-carrier scheduling constructs a sub-search space for each CC to receive a PDCCH about one or more scheduled CCs that can be scheduled on one PDCCH monitoring CC. At this time, interleaving is carried out for the entire space of sub-search spaces constructed by one UE. A UE constructs a sub-search space about self-scheduling PDCCH and sub-search spaces about cross-scheduling PDCCH in a CCE column of the PDCCH monitoring CC. In this case, a sub-search space for each CC can be constructed consecutively as shown in FIG. 16 or non-consecutively by using an offset.

Now, it is assumed that an extended search space includes CCEs indexed with 0 to 17 and three sub-search spaces. It is also assumed that a first sub-search space includes CCEs indexed with 0 to 5; a second sub-search space includes CCEs indexed with 6 to 11; and a third sub-search space includes CCEs indexed with 12 to 17. It is further assumed that CCE aggregation level L is 1 and the number of PDCCH candidates within each sub-search space is 6.

Interleaving distributes CCEs of each sub-search space in an interlaced form. That is, CCEs of each sub-search space are interleaved in a following form: CCE of the first sub-search space, CCE of the second sub-search space, CCE of the third sub-search space, CCE of the first sub-search space, and so on.

Interleaving is carried out by the unit of CCE aggregation level or by the unit of size of a PDCCH candidate. Since CCE aggregation level L is 1, CCEs of each sub-search space are interleaved by the unit of one CCE.

As described above, if interleaving is applied to an extended search space constructed for each UE rather than the whole of CCE columns, the number of CCEs to be interleaved amounts to (P*$M^{(L)}$*L). Here, P denotes the total number of scheduled CCs that are scheduled on one PDCCH monitoring CC and $M^{(L)}$ is the number of PDCCH candidates at CCE aggregation level L. The number of PDCCH candidates to be interleaved when each CCE aggregation level is taken into account is (P*$M^{(L)}$). Since a sub-search space for a particular CC of each UE is constructed according to individual CCE aggregation level, sub-search spaces having the same CCE aggregation level can be carried out even when interleaving is being performed.

Figure 17:
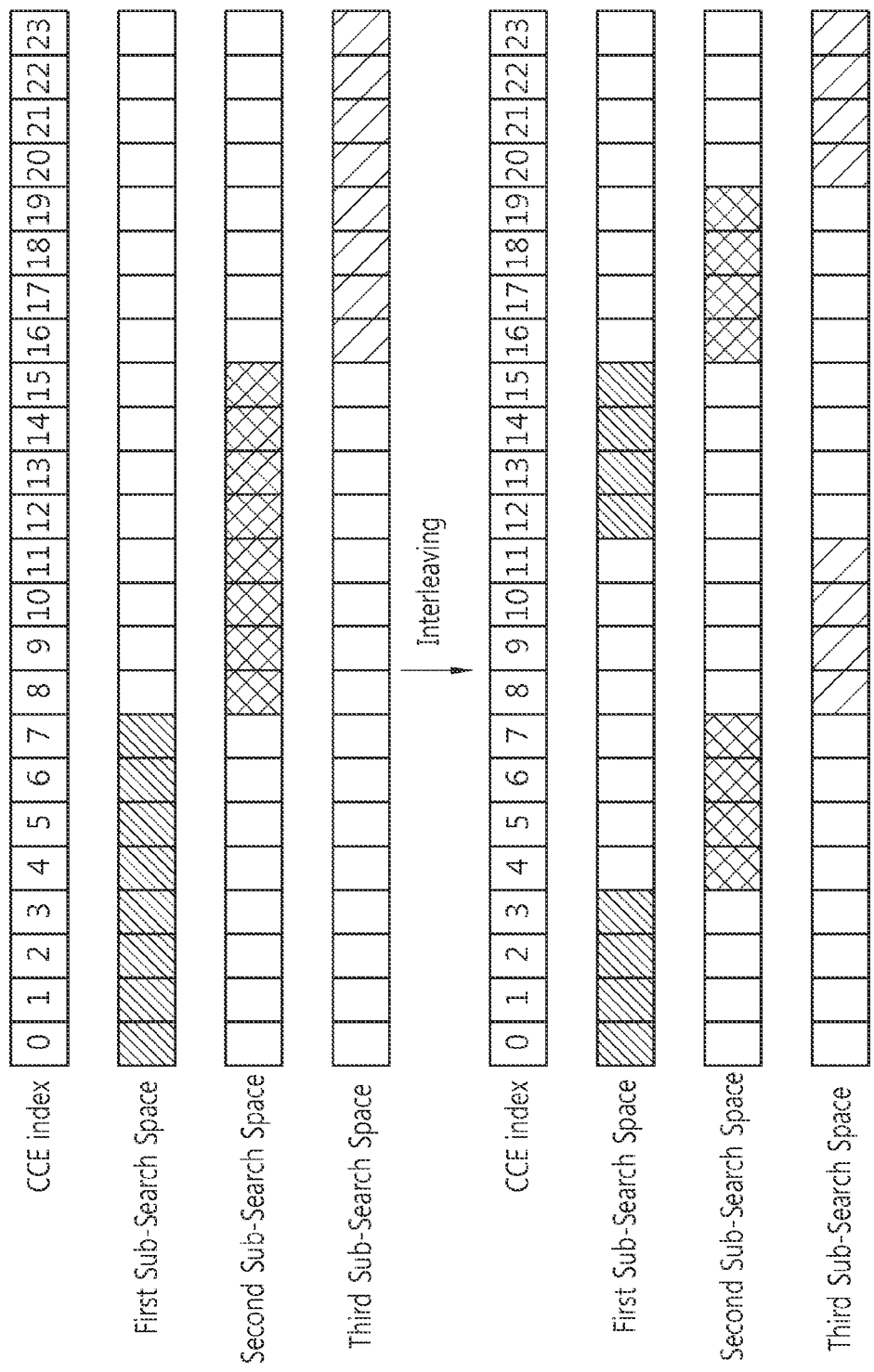
FIG. 17 illustrates interleaving in an extended search space according to one embodiment of the present invention.

FIG. 17 illustrates interleaving in an extended search space according to one embodiment of the present invention. Compared with the embodiment of FIG. 16, FIG. 17 assumes that CCE aggregation level L is 4 and the number of PDCCH candidates within each sub-search space is 2. Therefore, CCEs of each sub-search space are interleaved by the unit of four CCEs.

Figure 18:
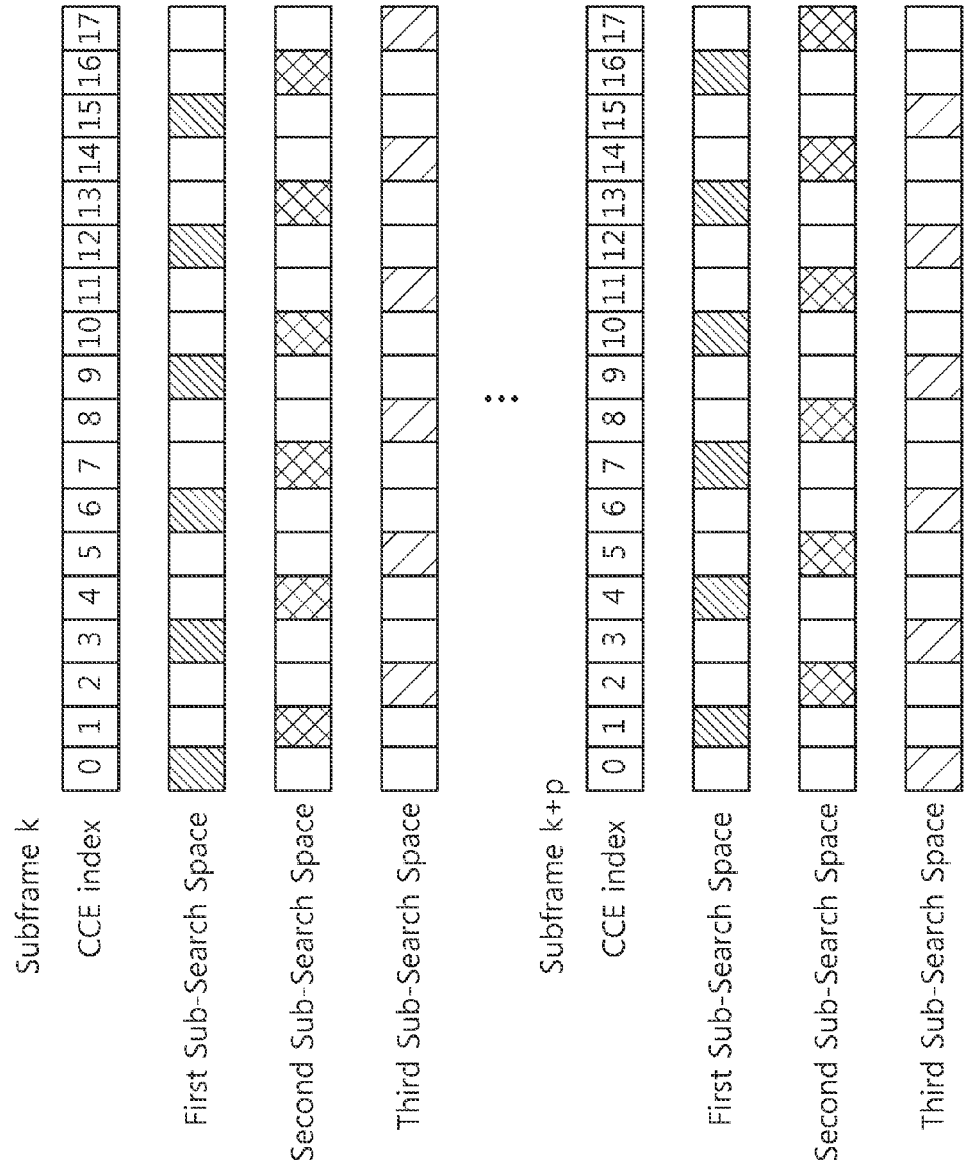
FIG. 18 illustrates one example of interleaving operation.

FIG. 18 illustrates one example of interleaving operation. FIG. 18 illustrates the operation when CCE aggregation level L of FIG. 16 is 1.

In a subframe k, three sub-search spaces within an extended search space are interleaved with one another.

For a subframe k+p (p≥1), three sub-search spaces within an extended search space are interleaved being shifted to the right by one from the CCE index interleaved at the subframe k.

Interleaving can be performed being shifted periodically or aperiodically. The unit of shifting can be applied to one PDCCH candidate for individual CCE aggregation level or the whole of PDCCH candidates.

Figure 19:
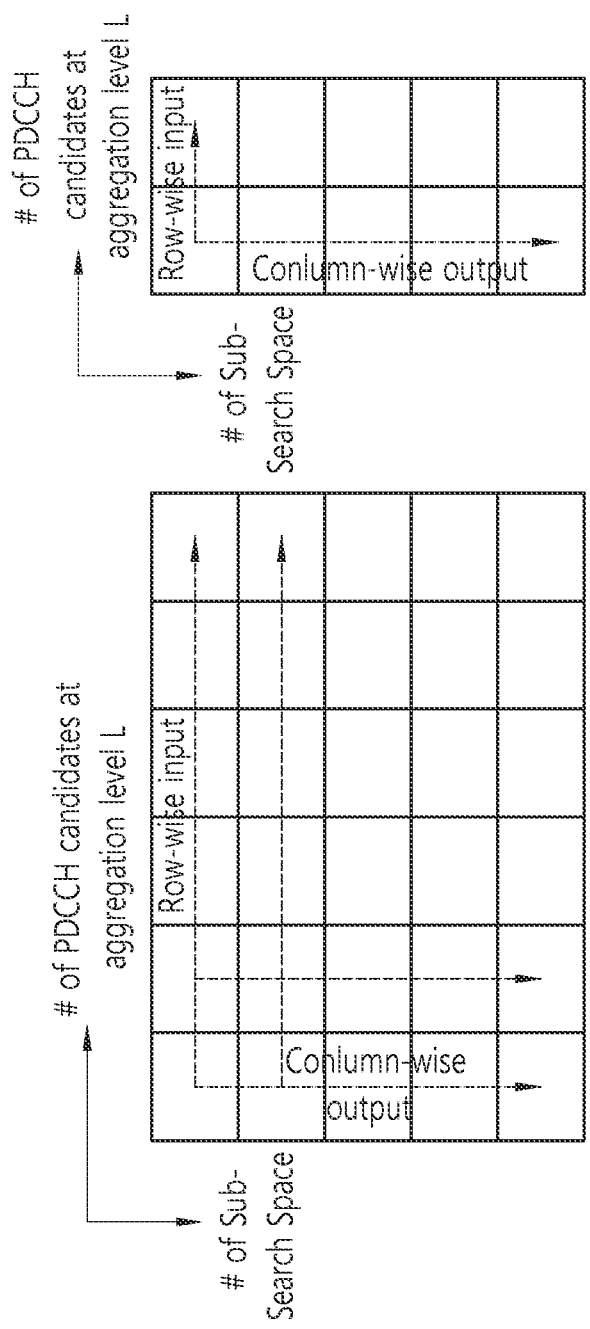
FIG. 19 illustrates an example of a block interleaver.

FIG. 19 illustrates an example of a block interleaver. Interleaving in the form of interlace can be performed by using a block interleaver.

The number of columns of a block interleaver is the number of PDCCH candidates at CCE aggregation level L while the number of rows is the number of sub-search spaces within an extended search space. That is, the number of rows of a block interleaver may be regarded to be the same as the number of CCs scheduled on one PDCCH monitoring CC.

Input to a block interleaver is performed row-wise while output is column-wise. However, it is just an example; if rows and columns of a block interleaver are exchanged, the input and the output may be changed accordingly.

FIG. 20 illustrates an example of a block interleaver for interleaving of FIG. 16. Since an extended search space includes three sub-search spaces, the number of block interleaver is 3. Also, since the number of PDCCH candidates at aggregation level L=1 is 6, the number of columns of a block interleaver is 6.

FIG. 21 illustrates an example of a block interleaver in an extended search space to which an offset is applied. While FIG. 16 illustrates an example for consecutive sub-search spaces, FIG. 21 assumes that an offset of 4 is applied to each sub-search space. A first sub-search space includes CCEs indexed with 0 to 5; a second sub-search space includes CCEs indexed with 9 to 14; and a third sub-search space includes CCEs indexed with 18 to 23. The offset of 4 denotes an offset from the last CCE index of the previous sub-search space. If an offset is defined from the first CCE index of the previous sub-search space, the offset can be 9.

Figure 22:
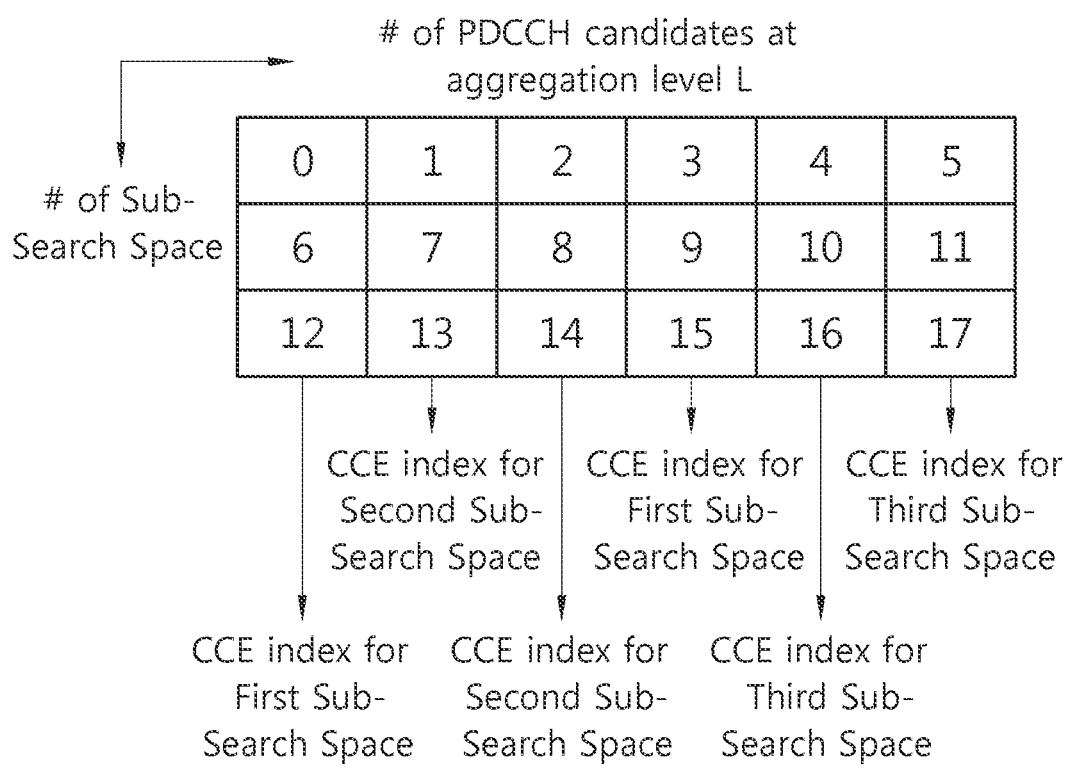
FIG. 22 illustrates interleaving of FIG. 16 by using an block interleaver of FIG. 20.

FIG. 22 illustrates interleaving of FIG. 16 by using a block interleaver of FIG. 20. Output to a block interleaver is performed column-wise. Individual columns are allocated to the respective sub-search spaces sequentially.

A first column is a CCE index for a first sub-search space; a second column is a CCE index for a second sub-search space; and a third column is a CCE index for a third sub-search space. A fourth column is a CCE index for the first sub-search space; a fifth column is a CCE index for the second sub-search space; and a sixth column is a CCE index for the third sub-search space.

As a result, CCE index interleaved in each sub-search space is the same as the interleaving result of FIG. 16.

Figure 23:
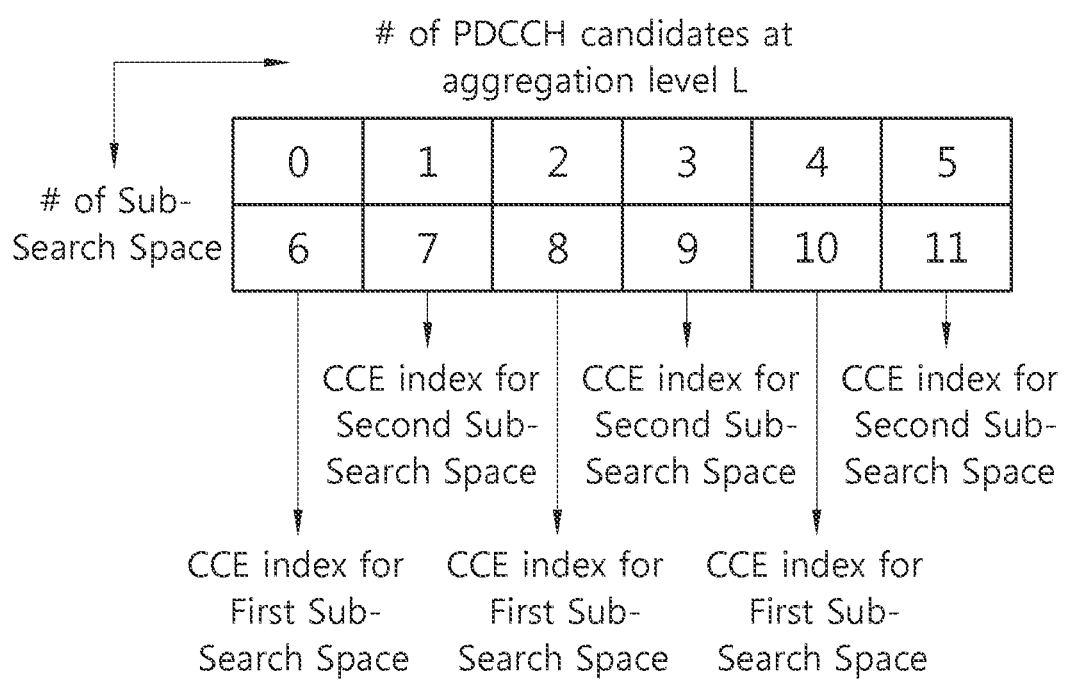
FIG. 23 illustrates another example of interleaving by using a block interleaver.

FIG. 23 illustrates another example of interleaving by using a block interleaver. The number of rows of a block interleaver is 2 when an extended search space includes two sub-search spaces. The number of columns of the block interleaver is 6 when the number of PDCCH candidates at aggregation level L=1 is 6.

A first column is a CCE index for a first sub-search space and a second column is a CCE index for a second sub-search space. A third column is a CCE index for the first sub-search space and a fourth column is a CCE index for the second sub-search space. A fifth column is a CCE index for the first sub-search space and a sixth column is a CCE index for the second sub-search space.

FIGS. 22 and 23 illustrate which sub-search space an output column of a block interleaver is allocated to.

FIG. 24 illustrates another example of configuring an output of a block interleaver. FIG. 24 shows the original CCE index and the CCE index after block interleaving (i.e., CCE index output from the interleaver) when the block interleaver of FIG. 20 is employed.

Figure 25:
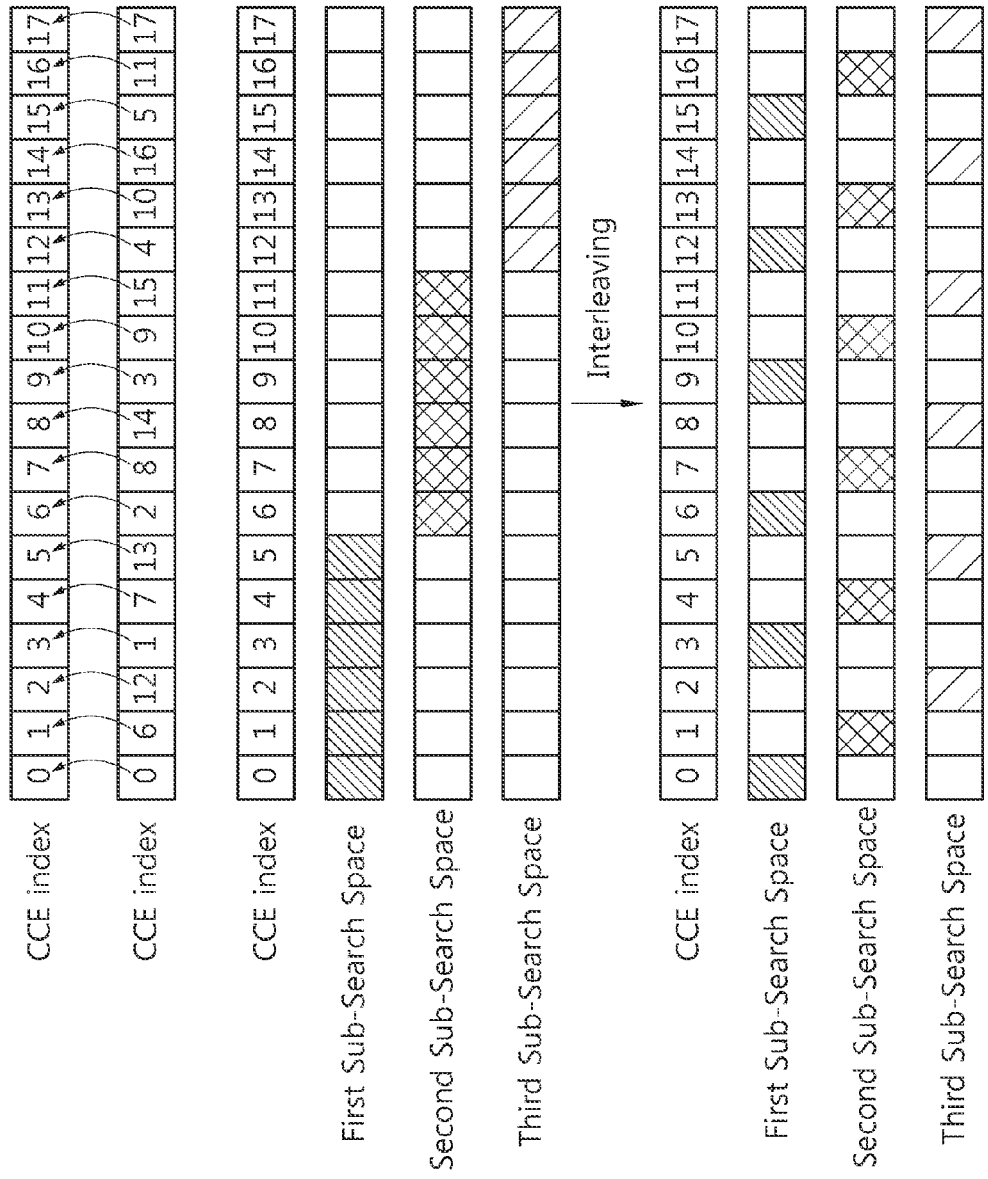
FIG. 25 illustrates an example of performing interleaving from an output of FIG. 24.

FIG. 25 illustrates an example of performing interleaving from an output of FIG. 24.

A sub-search space corresponding to CCE index 0 before interleaving is mapped to a position of CCE index 0 after interleaving. A sub-search space corresponding to CCE index 6 before interleaving is mapped to a position of CCE index 1 after interleaving. A sub-search space corresponding to CCE index 12 before interleaving is mapped to a position of CCE index 2 after interleaving. A sub-search space corresponding to CCE index 1 before interleaving is mapped to a position of CCE index 3 after interleaving. A sub-search space corresponding to CCE index 7 before interleaving is mapped to a position of CCE index 4 after interleaving.

In this way, if CCE index output from the interleaver is mapped to the original CCE index, the same interleaving result as FIG. 16 can be obtained.

FIG. 26 illustrates an example of a block interleaver for interleaving of FIG. 17. Since an extended search space includes three sub-search spaces, the number of rows of a block interleaver is 3. Also, since the number of PDCCH candidates at aggregation level L=4 is 2, the number of columns of the block interleaver is 2.

Figure 27:
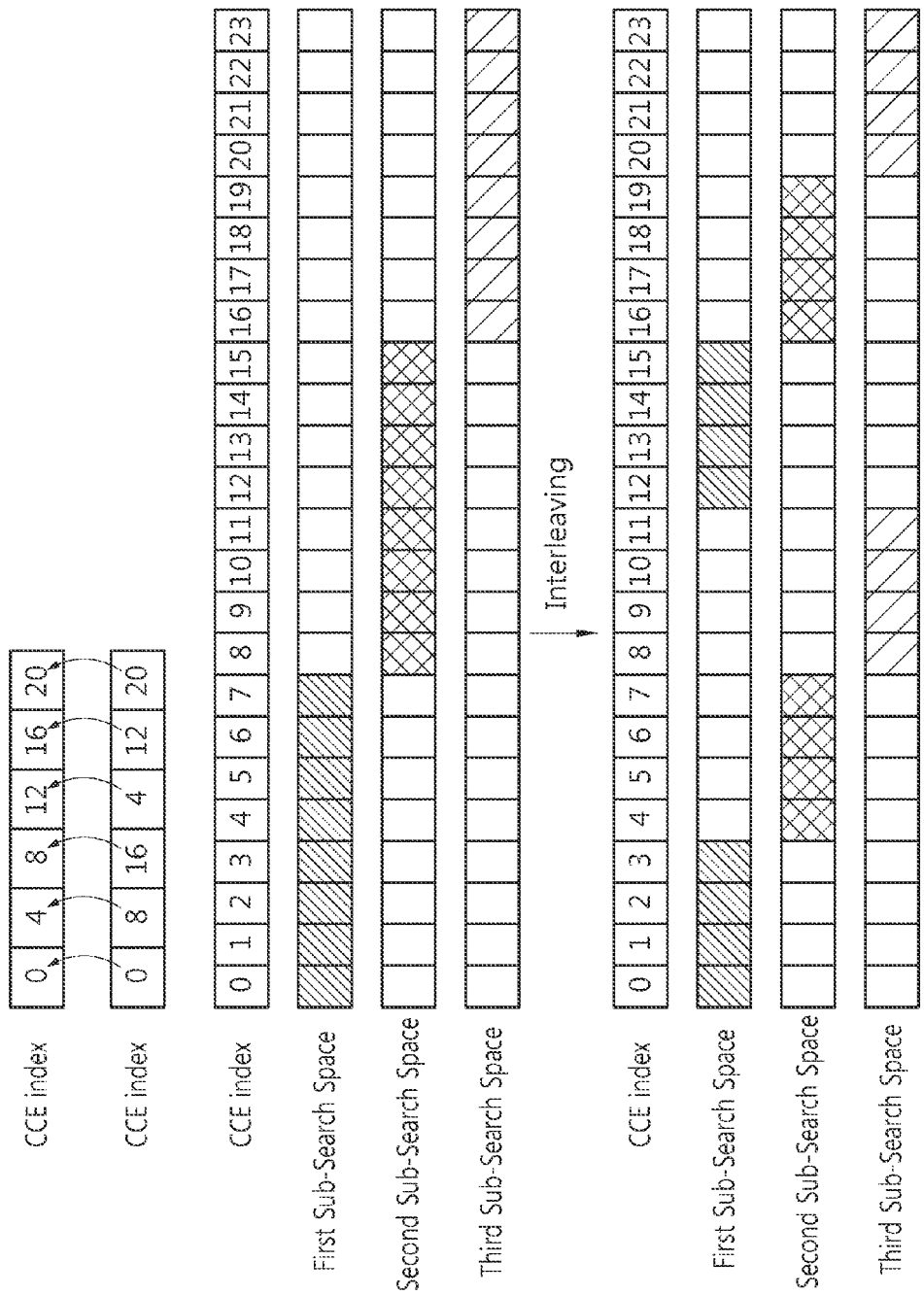
FIG. 27 illustrates interleaving by using a block interleaver of FIG. 26.

FIG. 27 illustrates interleaving by using a block interleaver of FIG. 26. The output CCE index of a block interleaver is 0, 8, 16, 4, 12, and 20 while the CCE index of each PDCCH candidate before interleaving is 0, 4, 8, 12, 16, and 20.

A sub-search space corresponding to CCE index 0 before interleaving is mapped to a position of CCE index 0 after interleaving. A sub-search space corresponding to CCE index 8 before interleaving is mapped to a position of CCE index 4 after interleaving. A sub-search space corresponding to CCE index 16 before interleaving is mapped to a position of CCE index 8 after interleaving. A sub-search space corresponding to CCE index 4 before interleaving is mapped to a position of CCE index 12 after interleaving. A sub-search space corresponding to CCE index 12 before interleaving is mapped to a position of CCE index 16 after interleaving. A sub-search space corresponding to CCE index 20 before interleaving is mapped to a position of CCE index 20 after interleaving.

In the embodiment of interleaving described above, interleaving can be performed by the unit of CCE aggregation rather than by the unit of CCE. A CCE aggregation includes at least one CCE. In the case when CCE aggregation level is 1, too, interleaving can still be performed by the unit of CCE. Also, in the case when CCE aggregation level is 4, interleaving can be performed by the unit of m CCE (m=1, 2, 3, 4, 5, 6, 7, 8) rather than 4 CCE.

For example, if CCE aggregation level is 2 and six PDCCH candidates are involved, a sub-search space includes 12 CCEs. The 12 CCEs can be interleaved with CCEs of another CC by grouping the 12 CCEs in the unit of CCE aggregation including 1, 2, 3, 4, 5, or 6 CCE.

If CCE aggregation level is 4 and two PDCCH candidates are involved, a sub-search space includes 8 CCEs. Interleaving can be applied to the 8 CCEs by grouping the 8 CCEs in the unit of CCE aggregation including 1, 2, 3, 4, or 8 CCE.

If CCE aggregation level is 8 and two PDCCH candidates are involved, a sub-search space includes 16 CCEs. Interleaving can be applied to the 16 CCEs by grouping the 16 CCEs in the unit of CCE aggregation including 1, 2, 4, 8, or 16 CCE.

Interleaving can be performed in the unit of a subgroup by grouping a plurality of sub-search spaces within an extended search space into subgroups. For example, five sub-search spaces can be grouped into a first subgroup including a first and a second sub-search group; and a second sub-search group including a third, a fourth, and a fifth sub-search group. That is, sub-search spaces within each subgroup are interleaved. Subgroups can be interleaved according to CCE aggregation units different from one another.

If interleaving is performed with the same CCE aggregation unit for different CCE aggregation levels, interleaving can also be applied to the different CCE aggregation levels.

A method for constructing an extended search space in an interlaced form can be expressed mathematically. If it is assumed that the number of scheduled CCs transmitted from one PDCCH monitoring CC is P (p=0, 1, ..., P−1), size of an extended search space becomes $P \cdot M^{(L)} \cdot L$. When an extended search space consists of consecutive sub-search spaces, the size of the whole of the extended search space can be defined as follows.

$$S_k^{(L)} = L \cdot \{(Y_k + m \cdot P) \bmod \lfloor N_{CCE,k}/L \rfloor\} + i \quad \text{[Equation 3]}$$

A sub-search space $S^{(L)}_{k,p}$ of a p-th CC in the extended search space can be defined as follows.

$$S_{k,p}^{(L)} = L \cdot \{(Y_{k,p} + m) \bmod \lfloor N_{CCE,k}/L \rfloor\} + i \quad \text{[Equation 4]}$$

where $Y_{k,p} = S_{k,p-1}^{(L)}(m = M^{(L)} - 1, i = L - 1) + 1$ or $Y_{k,p} = Y_k + p \cdot L \cdot M^{(L)}$.

A search space in an interlaced form in the extended search space consisting of consecutive sub-search spaces can be defined as follows.

$$S_{k,p}^{(L)} = L \cdot [\{(Y_k + p) + m \cdot P\} \bmod \lfloor N_{CCE,k}/L \rfloor] + i \quad \text{[Equation 5]}$$

where $Y_k$ is defined by equation 2.

A start point of a reference sub-search space within an extended search space can be defined by EQ. 2 in the same way as the existing 3GPP LTE. Here, the index p of a reference CC corresponding to the reference sub-search space can be chosen as p=0.

Allocation of index p for each CC can be varied according to individual subframe. That is, allocation of the index p for each CC can be varied for individual subframe in the form of cyclic shift.

As described above, although a sub-search space can be constructed in an interlaced form, the sub-search space can also be constructed by using interleaved CCE indices obtained by interleaving CCE indices of each sub-search space.

Figure 28:
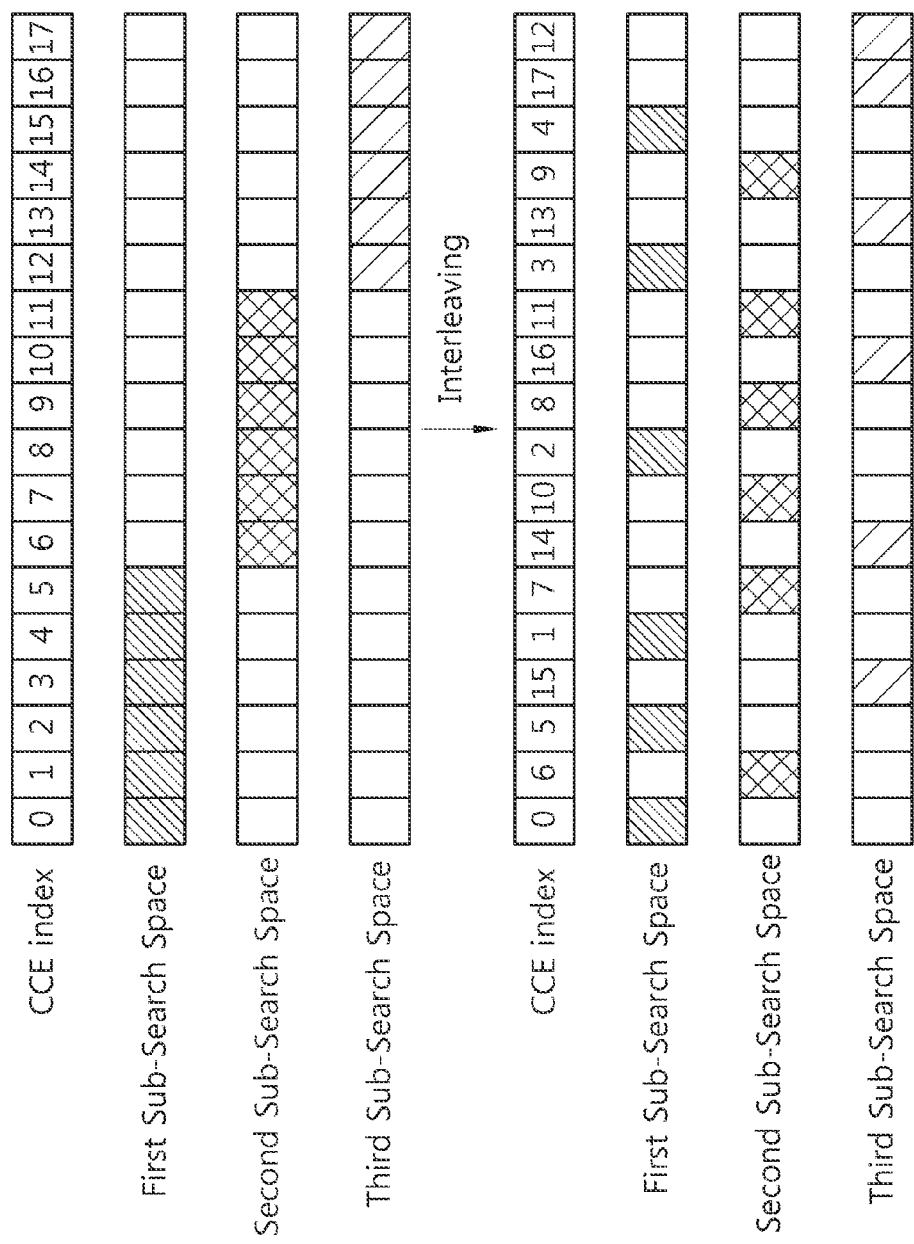
FIG. 28 illustrates one example of interleaving by using interleaved CCE index.

FIG. 28 illustrates one example of interleaving by using interleaved CCE index. A first sub-search space includes CCEs indexed with 0 to 5; a second sub-search space includes CCEs indexed with 6 to 11; and a third sub-search space includes CCEs indexed with 12 to 17. CCE indices 0 to 17 are interleaved and each sub-search space is mapped to the interleaved CCE index.

Figure 29:
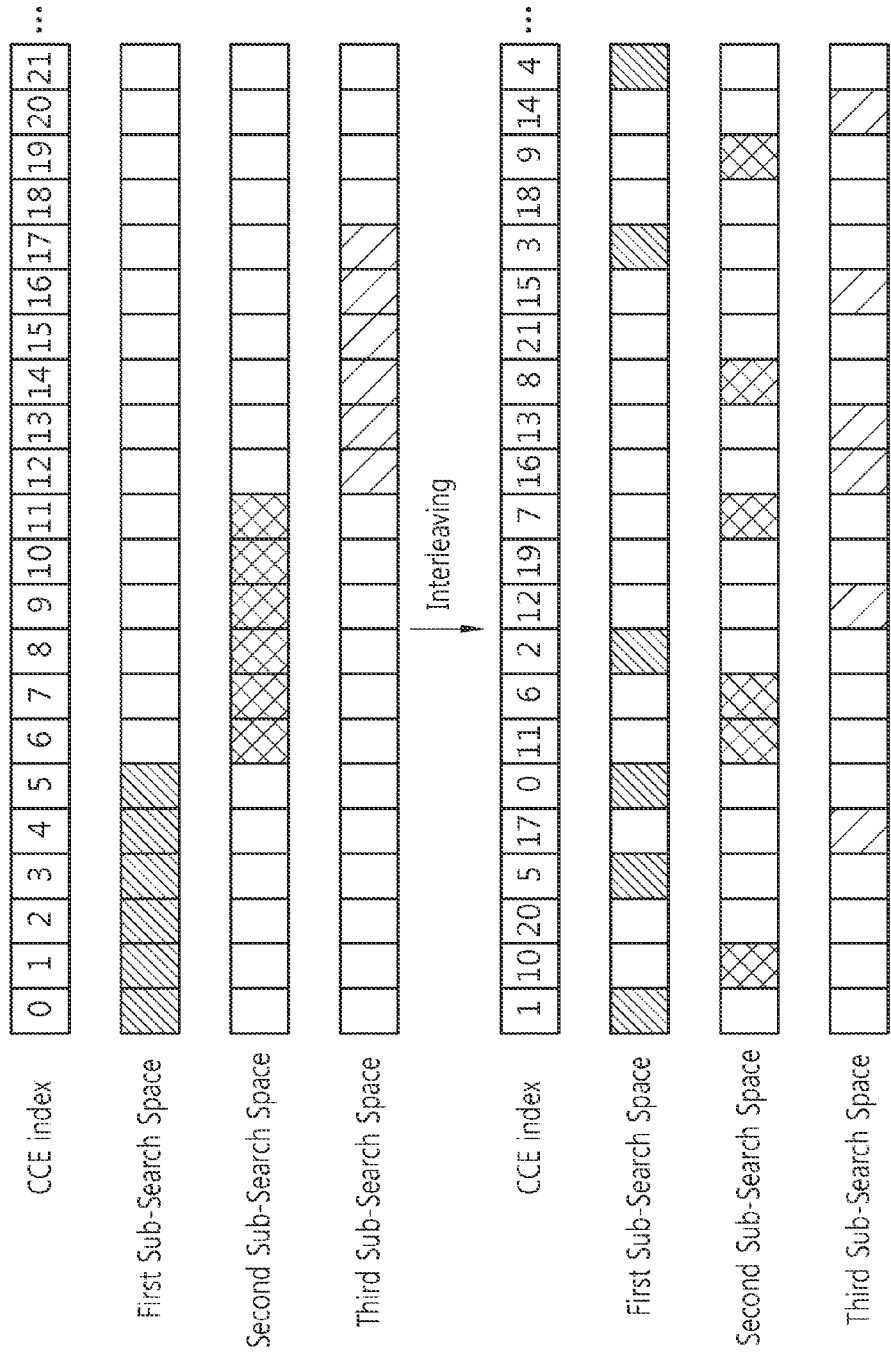
FIG. 29 illustrates another example of interleaving by using an interleaved CCE index.

FIG. 29 illustrates another example of interleaving by using an interleaved CCE index. The example of FIG. 29 described a case where interleaved CCE indices of an extended search space are not limited to the extended search space, but are applied to the whole of CCE indices of a control region.

According to the interleaved extended search space described above, even if a plurality of PDCCHs for a plurality of scheduled CCs are transmitted through a monitoring CC, it can be prevented that PDCCH for an arbitrary UE is concentrated on a particular CCE. In other words, a PDCCH blocking probability is lowered. Also, a BS can have flexibility in PDCCH scheduling.

Even if a plurality of PDCCHs for a plurality of scheduled CCs are transmitted to a control region due to cross-carrier scheduling, overlapping among search spaces can be reduced relatively.

To reduce the PDCCH blocking probability, a search space to which interleaving is applied can be enlarged. For example, an interleaving space can be defined by $Id = N_{CCE,k}/N_{div}$. $N_{div}$ is an arbitrary integer intended to randomize $N_{CCE,k}$. And a start point of an extended search space is selected as one from among $n*Id$ ($n=0, 1, \ldots, N_{div}-1$). By selecting the start point of the extended search space as a predetermined offset, more distributed interleaving can be made possible.

The above embodiments describe communication between a BS and a UE. In the case where a relay is involved, too, technical principles of the present invention can be applied to the communication between a BS and the relay and/or communication between the relay and a UE. If the present invention is applied to the communication between a BS and a relay, the relay can perform the function of a UE. If the present invention is applied to the communication between a relay and a UE, the relay can perform the function of a BS. Unless otherwise indicated, a UE can function as a UE or a relay.

Figure 30:
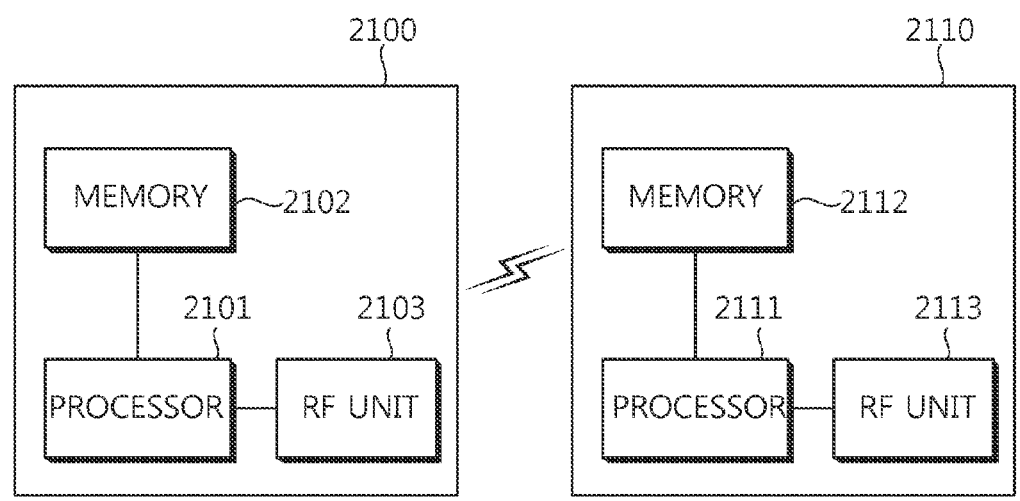
FIG. 30 illustrates a block diagram of a wireless communication system in which an embodiment of the present invention is implemented.

FIG. 30 illustrates a block diagram of a wireless communication system in which an embodiment of the present invention is implemented. The embodiment of an extended search space described above can be implemented by a BS and a UE.

A BS 2100 comprises a processor 2101, a memory 2102, and a radio frequency (RF) unit 2103.

A processor 2101 implements a disclosed function, a disclosed procedure, and/or a disclosed method. In the embodiment described above, operation of a BS can be implemented by the processor 2101. The processor 2101 can support operation for multiple carriers and configure a downlink physical channel in the extended search space described above by using interleaving.

A memory 2102, being connected to the processor 2101, stores protocol or parameters for operation of multiple carriers. An RF unit 2103, being connected to the processor 2101, transmits and/or receives radio signals.

A UE 2110 comprises a processor 2111, a memory 2112, and an RF unit 2113.

The processor 2111 implements a disclosed function, a disclosed procedure, and/or a disclosed method. The operation of a UE in the embodiment described above can be implemented by the processor 2111. The processor 2111 can support operation of multiple carriers and monitor a PDCCH about multiple CCs in an extended search space.

A memory 2112, being connected to the processor 2111, stores protocol or parameters for operation of multiple carriers. An RF unit 2113, being connected to the processor 2111, transmits and/or receives radio signals.

The processor 2101, 2111 can include application-specific integrated circuit (ASIC), other chipsets, logical circuits and/or a data processing apparatus. The memory 2102, 2112 can include read-only memory (ROM), random access memory (RAM), a flash memory, a memory card, storage medium and/or other storage devices. The RF unit 2103, 2113 can include a baseband circuit for processing radio signals. If embodiments are implemented by software, the techniques described above can be implemented in a module (procedures, functions, etc.) which carries out the functions described above. A module can be stored in the memory 2102, 2112 and can be carried out by the processor 2101, 2111. The memory 2102, 2112 can be installed inside or outside the processor 2101, 2111 and can be connected to the processor 2101, 2111 through various well-known means In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for monitoring a control channel in a multiple carrier system, the method comprising:
   determining an extended search space including a plurality of sub-search spaces in a control region of a subframe, each of the plurality of sub-search spaces corresponding to each of a plurality of scheduled component carriers;
   monitoring a downlink control channel for a scheduled component carrier corresponding to each of the plurality of sub-search spaces; and
   receiving downlink control information for a scheduled component carrier on a downlink control channel which is successfully decoded, each of the plurality of sub-search spaces including a plurality of control channel elements (CCEs), wherein the CCEs of the plurality of sub-search spaces are interleaved with one another in the extended search space.

2. The method of claim 1, wherein the CCEs of the plurality of sub-search spaces are interleaved by the unit of CCE aggregation level.

3. The method of claim 1, wherein the CCEs of the plurality of sub-search spaces are interleaved in an interlaced form.

4. The method of claim 1, wherein the CCEs of the plurality of sub-search spaces are interleaved by the unit of at least one CCE.

5. The method of claim 1, wherein the plurality of sub-search spaces are divided into a plurality of sub-groups and CCEs of a sub-search space belonging to each subgroup are interleaved with one another.

6. A user equipment (UE) for monitoring a control channel in a multiple carrier system, the UE comprising:
   a radio frequency unit configured to transmit and receive radio signals; and
   a processor operatively connected to the radio frequency unit and configured to:
   determine an extended search space including a plurality of sub-search spaces in a control region of a subframe, each of the plurality of sub-search spaces corresponding to each of a plurality of scheduled component carriers;

monitor a downlink control channel for a scheduled component carrier corresponding to each of the plurality of sub-search spaces; and receive downlink control information for a scheduled component carrier on a downlink control channel which is successfully decoded, each of the plurality of sub-search spaces including a plurality of control channel elements (CCEs), wherein the CCEs of the plurality of sub-search spaces are interleaved with one another in the extended search space.

7. The UE of claim 6, wherein the CCEs of the plurality of sub-search spaces are interleaved by the unit of CCE aggregation level.

8. The UE of claim 6, wherein the CCEs of the plurality of sub-search spaces are interleaved in an interlaced form.

9. The UE of claim 6, wherein the CCEs of the plurality of sub-search spaces are interleaved by the unit of at least one CCE.

10. The UE of claim 6, wherein the plurality of sub-search spaces are divided into a plurality of sub-groups and CCEs of a sub-search space belonging to each subgroup are interleaved with one another.

* * * * *